United States Patent
Shao et al.

(10) Patent No.: US 10,631,340 B2
(45) Date of Patent: Apr. 21, 2020

(54) RANDOM ACCESS METHOD AND APPARATUS, BASE STATION, AND UE

(71) Applicant: Huawei Technologies Co., Ltd., Shenzhen, Guangdong (CN)

(72) Inventors: Jiafeng Shao, Beijing (CN); Chaojun Li, Beijing (CN); Yongxia Lyu, Ottawa (CA); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/053,351

(22) Filed: Aug. 2, 2018

(65) Prior Publication Data

US 2018/0343683 A1 Nov. 29, 2018

Related U.S. Application Data

(63) Continuation of application No. PCT/CN2016/073379, filed on Feb. 3, 2016.

(51) Int. Cl.
*H04W 74/08* (2009.01)
*H04W 74/00* (2009.01)
(Continued)

(52) U.S. Cl.
CPC ..... *H04W 74/0833* (2013.01); *H04W 72/042* (2013.01); *H04W 72/1284* (2013.01);
(Continued)

(58) Field of Classification Search
CPC ......... H04W 74/0833; H04W 72/1284; H04W 72/042; H04W 88/08; H04W 88/02; H04W 76/10; H04W 72/1289; H04W 74/008
See application file for complete search history.

(56) References Cited

U.S. PATENT DOCUMENTS

2008/0261600 A1 10/2008 Somasundaram et al.
2014/0071964 A1 3/2014 Chun et al.
(Continued)

FOREIGN PATENT DOCUMENTS

CN 101128028 A 2/2008
CN 102740407 A 10/2012
(Continued)

OTHER PUBLICATIONS

R1-156819—Samsung, "Study on Specification Impact for Downlink due to TTI Shortening," 3GPP TSG-RAN W1 Meeting #83, Anaheim, USA, Nov. 15-22, 2015, 7 pages.
(Continued)

*Primary Examiner* — Afshawn M Towfighi
(74) *Attorney, Agent, or Firm* — Fish & Richardson P.C.

(57) ABSTRACT

The present disclosure relates to the field of wireless communications technologies, and discloses a random access method and apparatus, a base station, and UE, to resolve a problem of long time required by random access. According to embodiments of the present disclosure, a base station receives a random access preamble sent by user equipment UE, where the random access preamble is used to indicate that the UE has a first transmission capability; the base station sends DCI to the UE by using a PDCCH; the base station sends an RAR for the random access preamble to the UE by using a DL-SCH transport block indicated by the DCI; and the base station receives a UL-SCH transport block sent by the UE according to uplink scheduling information carried by the RAR. Solutions provided by the embodiments of the present disclosure are applicable to a process in which UE accesses a network.

17 Claims, 6 Drawing Sheets

(51) Int. Cl.
*H04W 72/04* (2009.01)
*H04W 72/12* (2009.01)
*H04W 76/10* (2018.01)
*H04W 88/02* (2009.01)
*H04W 88/08* (2009.01)

(52) U.S. Cl.
CPC ...... *H04W 74/008* (2013.01); *H04W 72/1289* (2013.01); *H04W 76/10* (2018.02); *H04W 88/02* (2013.01); *H04W 88/08* (2013.01)

(56) References Cited

U.S. PATENT DOCUMENTS

| | | |
|---|---|---|
| 2015/0016431 A1 | 1/2015 | Ranta-Aho et al. |
| 2017/0164363 A1 | 6/2017 | Zhang et al. |
| 2018/0310282 A1* | 10/2018 | Shi .............. H04W 72/042 |
| 2019/0045394 A1* | 2/2019 | Takano .......... H04W 72/042 |

FOREIGN PATENT DOCUMENTS

| | | |
|---|---|---|
| CN | 104067683 A | 9/2014 |
| CN | 104468030 A | 3/2015 |
| EP | 3113569 A1 | 1/2017 |
| JP | 2015-508624 A | 3/2015 |
| WO | 2014133320 A1 | 9/2014 |
| WO | 2015/139318 A1 | 9/2015 |

OTHER PUBLICATIONS

Notification of Refusal issued in Japanese Application No. 2018-540369 on Apr. 5, 2019, 6 pages (with English translation).
Ericsson, Huawei, RP-150465, "New SI proposal: Study on Latency reduction techniques for LTE," 3GPP TSG RAN Meeting #67, Shanghai, China, Mar. 9-12, 2015, 8 pages.
3GPP TS 36.321 V13.0.0 (Dec. 2015), Technical Specification, 3rd Generation Partnership Project; Technical Specification Group Radio Access Network; Evolved Universal Terrestrial Radio Access (E-UTRA); Medium Access Control (MAC) protocol specification (Release 13), Dec. 2015, 82 pages.
Samsung, "Study on specification impact for downlink due to TTI shortening", 3GPP TSG RAN WG1 Meeting #83, Nov. 15-22, 2015, 6 pages, R1-156819.
ZTE, "Utilization of short TTI in higher layer", 3GPP TSG-RAN WG2 meeting #91bis, Malmo, Sweden, Oct 5-9, 2015, 4 pages, R2-154172.
Ericsson, "Study of shorter TTI for latency reduction", 3GPP TSG-RAN WG2 #91bis, Malmö, Sweden, Oct. 5-9, 2015, 8 pages, Tdoc R2-154740.
ETRI, "Consideration on Random Access for Heterogeneous TTIs in a Carrier", 3GPP TSG-RAN WG2 Meeting #91, Aug. 24-28, 2015, 4 pages, R2-153548.
Office Action issued in Chinese Application No. 201680079644.1 on Feb. 25, 2020, 5 pages.

* cited by examiner

RANDOM ACCESS METHOD AND APPARATUS, BASE STATION, AND UE

CROSS-REFERENCE TO RELATED APPLICATIONS

This application is a continuation of International Application No. PCT/CN2016/073379, filed on Feb. 3, 2016, which is hereby incorporated by reference in its entireties.

TECHNICAL FIELD

The present application relates to the field of wireless communications technologies, and in particular, to a random access method and apparatus, a base station, and UE.

BACKGROUND

In an Long Term Evolution (LTE) or Long Term Evolution Advanced (LTE-A) system, a process in which User Equipment (UE) establishes a connection to a network is a random access process. The random access process of the UE is as follows: The UE sends a random access preamble to a base station by using a PRACH. After receiving the random access preamble, the base station replies to the UE with a random access response (RAR) by using a PDSCH. Then the UE sends a message 3 in the random access process by using a PUSCH. Finally, the base station replies to the UE with a contention resolution message.

In the random access process, the base station and the UE transmit messages by using a transmission time interval (TTI) of 1 ms as a basic transmission unit. To reduce a random access time, a shorter TTI may be used. However, limited by a channel environment of the UE or a scheduling status of the base station, in the random access process, if a TTI for transmitting messages is directly reduced, the UE cannot correctly receive a message, further resulting in an access failure. Therefore, a problem of long random access time still exists in the prior art.

SUMMARY

Embodiments of the present disclosure provide a random access method and apparatus, a base station, and UE, to resolve a problem of long time required by random access.

To achieve the foregoing objective, the following technical solutions are used in the embodiments of the present disclosure:

A first aspect of the present disclosure provides a network access method, including:

receiving, by a base station, a random access preamble sent by user equipment UE, where the random access preamble is used to indicate that the UE has a first transmission capability, and the first transmission capability is a capability of transmitting a transmission time unit of a first time length;

sending, by the base station, downlink control information DCI to the UE by using a physical downlink control channel PDCCH, where the DCI carries transmission time unit indication information and/or transport block indication information, the transmission time unit indication information is used to indicate a time length of a transmission time unit of a DL-SCH transport block and/or an uplink shared channel UL-SCH transport block, the time length of the transmission time unit is the first time length or a second time length, the second time length is greater than the first time length, and the transport block indication information includes DL-SCH transport block location information and/or UL-SCH transport block location information;

sending, by the base station, a random access response RAR for the random access preamble to the UE by using the DL-SCH transport block indicated by the DCI; and receiving, by the base station, a UL-SCH transport block sent by the UE according to uplink scheduling information carried by the RAR.

Compared with the prior art in which UE cannot correctly receive a message when a TTI for transmitting the message is directly reduced, in this method, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station. In addition, the UE may also send a message to the base station in the short TTI according to the transmission time unit indication information of the base station. In this way, a time length of a transmission time unit during information transmission is reduced, and further a random access time is reduced.

With reference to the first aspect, it should be noted that the sending, by the base station, a random access response RAR for the random access preamble to the UE by using the DL-SCH transport block indicated by the DCI includes:

when the DCI carries the transmission time unit indication information, sending, by the base station, the DL-SCH transport block carrying the RAR for the random access preamble to the UE, where the time length of the transmission time unit of the DL-SCH transport block is the time length indicated by the transmission time unit indication information, and the transmission time unit of the DL-SCH transport block is a transmission time unit adjacent to a transmission time unit of the PDCCH or a transmission time unit of the PDCCH;

when the DCI carries the transport block indication information, sending, by the base station, at a location indicated by the DL-SCH transport block location information indicated by the transport block indication information, the DL-SCH transport block carrying the RAR for the random access preamble to the UE, where the time length of the transmission time unit of the DL-SCH transport block is a preset time length, and the DL-SCH transport block location information includes information about a time domain resource and/or a frequency domain resource of the DL-SCH transport block; or when the DCI carries the transmission time unit indication information and the transport block indication information, sending, by the base station, at a location indicated by the DL-SCH transport block location information indicated by the transport block indication information, the DL-SCH transport block carrying the RAR for the random access preamble to the UE, where the time length of the transmission time unit of the DL-SCH transport block is the time length indicated by the transmission time unit indication information.

With reference to the first aspect, it should be further noted that the receiving, by the base station, a UL-SCH transport block sent by the UE according to uplink scheduling information carried by the RAR includes:

when the DCI carries the transmission time unit indication information, receiving, by the base station according to the transmission time unit indication information on a preset time domain resource of the UL-SCH transport block, the UL-SCH transport block sent by the UE according to the uplink scheduling information carried by the RAR, where the time length of the transmission time unit of the UL-SCH transport block is the time length indicated by the transmission time unit indication information;

when the DCI carries the transport block indication information, receiving, by the base station, according to the transport block indication information carried by the DCI, and at a location indicated by the UL-SCH transport block location information indicated by the transport block indication information, the UL-SCH transport block sent by the UE according to the uplink scheduling information carried by the RAR, where the UL-SCH transport block location information includes information about a time domain resource and/or a frequency domain resource of the UL-SCH transport block, and the time length of the transmission time unit of the UL-SCH transport block is a preset time length of the transmission time unit; or when the DCI carries the transmission time unit indication information and the transport block indication information, receiving, by the base station, according to the transmission time unit indication information and the transport block indication information that are carried by the DCI, and at a location indicated by the UL-SCH transport block location information indicated by the transport block indication information, the UL-SCH transport block sent by the UE according to the uplink scheduling information carried by the RAR, where the time length of the transmission time unit of the UL-SCH transport block is the time length indicated by the transmission time unit indication information.

According to the random access method provided in this embodiment of the present disclosure, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station, and send a message to the base station in the short TTI according to the transmission time unit indication information of the base station. Therefore, the base station can also correctly receive, according to the transmission time unit indication information and/or the transport block indication information carried by the DCI, the UL-SCH transport block sent by the UE. In this way, a time length of a transmission time unit during information transmission is reduced, and further a random access time is reduced.

Based on the first aspect, optionally, before the sending, by the base station, downlink control information DCI to the UE by using a physical downlink control channel PDCCH, the method further includes:

determining, by the base station according to the random access preamble, that a format of the DCI is a first DCI format, where the first DCI format is a DCI format to be detected only by the UE having the first transmission capability.

Optionally, the UE having the first transmission capability may be caused to detect only the DCI in the first DCI format, without a need to detect a DCI in another format, preventing the UE from performing blind detection on the DCI in the another format.

Based on the first aspect, optionally, before the sending, by the base station, downlink control information DCI to the UE by using a physical downlink control channel PDCCH, the method further includes:

determining, by the base station according to the random access preamble, that a format of the DCI is a DCI format 1A or a DCI format 1C, where a bit field used for carrying the transmission time unit indication information and/or the transport block indication information exists in each of the DCI format 1A and the DCI format 1C.

In the technical solution of the present disclosure, both the DCI format 1A and the DCI format 1C are existing DCI formats. Transmission time unit indication information and/or transport block indication information is added to a DCI in an existing format, but a total bit quantity of the DCI format 1A and the DCI format 1C is not increased. Because both the DCI format 1A and the DCI format 1C are DCI formats that can be identified by any UE, the UE does not perform additional blind detection.

In a solution described according to the first aspect, if the format of the DCI is the DCI format 1A, bit information in an MCS bit f in the DCI is used to indicate the transmission time unit indication information; or if the format of the DCI is the DCI format 1C, bit information of a bit field in at least one of a new data indicator NDI bit field, a redundancy version RV bit field, and a most significant bit (MSB) bit field of a transmission power control (TPC) bit field in the DCI is used to indicate the transmission time unit indication information and/or the transport block indication information.

Based on the first aspect, before the sending, by the base station, downlink control information DCI to the UE by using a physical downlink control channel PDCCH, the method further includes:

scrambling, by the base station according to a random access radio network temporary identifier RA-RNTI, the DCI carried by the PDCCH, where the RA-RNTI is $(1+t\_id+10*f\_id+X) \bmod Y+1$, where values of X and Y are integers; or the RA-RNTI is $65301+(10*t\_id+f\_id) \bmod 9$, where $t\_id$ is a sequence number of a first subframe of a PRACH that is detected by the base station and that carries the random access preamble, $0 \le t\_id < 10$, $f\_id$ is a second PRACH index of a first sub frame of the PRACH carrying the random access preamble, and $0 \le f\_id < 6$.

In a technical solution provided in the present disclosure, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station. In addition, the UE may also send a message to the base station in the snort TTI according to the transmission time unit indication information of the base station. In this way, a time length of a transmission time unit during information transmission is reduced, and further a random access time is reduced.

A second aspect of the present disclosure provides a network access method, including:

sending, by user equipment UE, a random access preamble to a base station, where the random access preamble is used to indicate that the UE has a first transmission capability, and the first transmission capability is a capability of transmitting a transmission time unit of a first time length;

receiving, by the UE, downlink control information DCI sent by the base station by using a physical downlink control channel PDCCH, where the DCI carries transmission time unit indication information and/or transport block indication information, the transmission time unit indication information is used to indicate a time length of a transmission time unit of a DL-SCH transport block and/or an uplink shared channel UL-SCH transport block, the time length of the transmission time unit is the first time length or a second time length, the second time length is greater than the first time length, and the transport block indication information includes DL-SCH transport block location information and/or UL-SCH transport block location information;

receiving, by the UE according to the DCI, a random access response RAR that is for the random access preamble and that is sent by the base station according to the DL-SCH transport block indicated by the DCI; and sending, by the UE, a UL-SCH transport block according to uplink scheduling information carried by the RAR.

In a technical solution provided in the present disclosure, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station, and send a message to the base station in the short TTI according to the transmission time unit indication information of the base station. In this way, a time length of a transmission time unit during information transmission is reduced, and further a random access time is reduced.

With reference to the second aspect, it should be noted that the receiving, by the UE according to the DCI, a random access response RAR that is for the random access preamble and that is sent by the base station according to the DL-SCH transport block indicated by the DCI includes:

when the DCI carries the transmission time unit indication information, receiving, by the UE, the DL-SCH transport block that carries the RAR for the random access preamble and that is sent by the base station, where the time length of the transmission time unit of the DL-SCH transport block is the time length indicated by the transmission time unit indication information, and the transmission time unit of the DL-SCH transport block is a transmission time unit adjacent to a transmission time unit of the PDCCH or a transmission time unit of the PDCCH;

when the DCI carries the transport block indication information, receiving, by the UE, at a location indicated by the DL-SCH transport block location information indicated by the transport block indication information, the DL-SCH transport block that carries the RAR for the random access preamble and that is sent by the base station, where the time length of the transmission time unit of the DL-SCH transport block is a preset time length, and the DL-SCH transport block location information includes information about a time domain resource and/or a frequency domain resource of the DL-SCH transport block; or when the DCI carries the transmission time unit indication information and the transport block indication information, receiving, by the UE, at a location indicated by the DL-SCH transport block location information indicated by the transport block indication information, the DL-SCH transport block that carries the RAR for the random access preamble and that is sent by the base station, where the time length of the transmission time unit of the DL-SCH transport block is the time length indicated by the transmission time unit indication information.

With reference to the second aspect, it should be further noted that the sending, by the UE, a UL-SCH transport block according to uplink scheduling information carried by the RAR includes:

when the DCI carries the transmission time unit indication information, sending, by the UE, on a preset time domain resource of the UL-SCH transport block, the UL-SCH transport block to the base station according to the uplink scheduling information carried by the RAR and the transmission time unit indication information, where the time length of the transmission time unit of the UL-SCH transport block is the time length indicated by the transmission time unit indication information;

when the DCI carries the transport block indication information, sending, by the UE, at a location indicated by the UL-SCH transport block location information indicated by the transport block indication information, the UL-SCH transport block to the base station according to the uplink scheduling information carried by the RAR and the transport block indication information carried by the DCI, where the time length of the transmission time unit of the UL-SCH transport block is a preset time length, and the UL-SCH transport block location information includes information about a time domain resource and/or a frequency domain resource of the UL-SCH transport block; or when the DCI carries the transmission time unit indication information and the transport block indication information, sending, by the UE, at a location indicated by the UL-SCH transport block location information indicated by the transport block indication information, the UL-SCH transport block to the base station according to the uplink scheduling information carried by the RAR and the transmission time unit indication information and the transport block indication information that are carried by the DCI, where the time length of the transmission time unit of the UL-SCH transport block is the time length indicated by the transmission time unit indication information.

Because the DCI carries the transmission time unit indication information, and the transmission time unit indication information and/or the transport block indication information may indicate that the UE sends a message to the base station in a short TTI, the base station can also correctly receive, according to the transmission time unit indication information and/or the transport block indication information carried by the DCI, the UL-SCH transport block sent by the UE. In this way, a time length of a transmission time unit during information transmission is reduced, and further a random access time is reduced.

Based on the second aspect, after the receiving, by the UE, downlink control information DCI sent by the base station by using a physical downlink control channel PDCCH, the method further includes:

determining, by the UE, a format of the received DCI; and if the format of the DCI is a first DCI format, obtaining, by the UE, the transmission time unit indication information and/or the transport block indication information from the DCI, where the first DCI format is a DCI format to be detected only by the UE having the first transmission capability, where optionally, the UE having the first transmission capability may be caused to detect only the DCI in the first DCI format, without a need to detect a DCI in another format, preventing the UE from performing blind detection on the DCI in the another format;

if the format of the DCI is a DCI format 1A, obtaining, by the UE, the transmission time unit indication information from bit information in an MCS bit field in the DCI; or if the format of the DCI is a DCI format 1C, obtaining, by the UE, the transmission time unit indication information and/or the transport block indication information from bit information of a bit field in at least one of a new data indicator NDI bit field, a redundancy version RV bit field, and a MSB bit field of a TPC bit field in the DCI.

Both the DCI format 1A and the DCI format 1C are existing DCI formats. Transmission time unit indication information and/or transport block indication information is added to a DCI in an existing format, but a total bit quantity of the DCI format 1A and the DCI format 1C is not increased. Because both the DCI format 1A and the DCI format 1C are DCI formats that can be identified by any UE, the UE does not perform additional blind detection.

In a solution described according to the second aspect, after the receiving, by the UE, downlink control information DCI sent by the base station by using a physical downlink control channel PDCCH, the method further includes:

determining, by the UE, a random access radio network temporary identifier RA-RNTI, where the RA-RNTI is $(1+t\_id+10*f\_id+X) \bmod Y+1$, where values of X and Y are integers; or the RA-RNTI is $65301+(10*t\_id+f\_id) \bmod 9$, where t_id is a sequence number of a first subframe of a PRACH carrying the random access preamble, $0 \leq t\_id < 10$, f_id is a second PRACH index of a first subframe of the PRACH carrying the random access preamble, and $0 \leq f\_id < 6$; and descrambling, by the UE according to the RA-RNTI, the DCI carried by the PDCCH.

In a technical solution of the present disclosure, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station, and send a message to the base station in the short TTI according to the transmission time unit indication information of the base station. In this way, a time length of a transmission time unit during information transmission is reduced, and further a random access time is reduced.

A third aspect of the present disclosure provides a random access apparatus, where the apparatus is applied to a base station, and includes:

a receiving unit, configured to receive a random access preamble sent by user equipment UE, where the random access preamble is used to indicate that the UE has a first transmission capability, and the first transmission capability is a capability of transmitting a transmission time unit of a first time length;

a sending unit, configured to send downlink control information DCI to the UE by using a physical downlink control channel PDCCH, where the DCI carries transmission time unit indication information and/or transport block indication information, the transmission time unit indication information is used to indicate a time length of a transmission time unit of a DL-SCH transport block and/or an uplink shared channel UL-SCH transport block, the time length of the transmission time unit is the first time length or a second time length, the second time length is greater than the first time length, and the transport block indication information includes DL-SCH transport block location information and/or UL-SCH transport block location information; and a processing unit, configured to control the sending unit to send a random access response RAR for the random access preamble to the UE by using the DL-SCH transport block indicated by the DCI, where the receiving unit is further configured to receive a UL-SCH transport block sent by the UE according to uplink scheduling information carried by the RAR.

With reference to the third aspect, it should be noted that the processing unit is further configured to: when the DCI carries the transmission time unit indication information, control the sending unit to send the DL-SCH transport block carrying the RAR for the random access preamble to the UE, where the time length of the transmission time unit of the DL-SCH transport block is the time length indicated by the transmission time unit indication information, and the transmission time unit of the DL-SCH transport block is a transmission time unit adjacent to a transmission time unit of the PDCCH or a transmission time unit of the PDCCH; when the DCI carries the transport block indication information, control the sending unit to send, at a location indicated by the DL-SCH transport block location information indicated by the transport block indication information, the DL-SCH transport block carrying the RAR for the random access preamble to the UE, where the time length of the transmission time unit of the DL-SCH transport block is a preset time length, and the DL-SCH transport block location information includes information about a time domain resource and/or a frequency domain resource of the DL-SCH transport block; or when the DCI carries the transmission time unit indication information and the transport block indication information, control the sending unit to send, at a location indicated by the DL-SCH transport block location information indicated by the transport block indication information, the DL-SCH transport block carrying the RAR for the random access preamble to the UE, where the time length of the transmission time unit of the DL-SCH transport block is the time length indicated by the transmission time unit indication information.

With reference to the third aspect, it should be further noted that the processing unit is further configured to: when the DCI carries the transmission time unit indication information, control the receiving unit to receive, according to the transmission time unit indication information on a preset time domain resource of the UL-SCH transport block, the UL-SCH transport block sent by the UE according to the uplink scheduling information carried by the RAR, where the time length of the transmission time unit of the UL-SCH transport block is the time length indicated by the transmission time unit indication information; when the DCI carries the transport block indication information, control the receiving unit to receive, according to the transport block indication information carried by the DCI, and at a location indicated by the UL-SCH transport block location information indicated by the transport block indication information, the UL-SCH transport block sent by the UE according to the uplink scheduling information carried by the RAR, where the UL-SCH transport block location information includes information about a time domain resource and/or a frequency domain resource of the UL-SCH transport block, and the time length of the transmission time unit of the UL-SCH transport block is a preset time length of the transmission time unit; or when the DCI carries the transmission time unit indication information and the transport block indication information, control the receiving unit to receive, according to the transmission time unit indication information and the transport block indication information that are carried by the DCI, and at a location indicated by the UL-SCH transport block location information indicated by the transport block indication information, the UL-SCH transport block sent by the UE according to the uplink scheduling information carried by the RAR, where the time length of the transmission time unit of the UL-SCH transport block is the time length indicated by the transmission time unit indication information.

Based on the third aspect, the processing unit includes:

a determining module, configured to determine, according to the random access preamble received by the receiving unit, that a format of the DCI is a first DCI format, where the first DCI format is a DCI format to be detected only by the UE having the first transmission capability.

In the third aspect, it may be understood that the determining module is further configured to determine, according to the random access preamble received by the receiving unit, that a format of the DCI is a DCI format 1A or a DCI format 1C, where a bit field used for carrying the transmission time unit indication information and/or the transport block indication information exists in each of the DCI format 1A and the DCI format 1C.

In a solution described according to the third aspect, if the format of the DCI is the DCI format 1A, bit information in an MCS bit field in the DCI is used to indicate the transmission time unit indication information; or if the format of the DCI is the DCI format 1C, bit information of a bit field in at least one of a new data indicator NDI bit field, a redundancy version RV bit field, and a MSB bit field of a TPC bit field in the DCI is used to indicate the transmission time unit indication information and/or the transport block indication information.

Based on the third aspect, the processing unit further includes:

a scrambling module is configured to scramble, according to a random access radio network temporary identifier RA-RNTI, the DCI carried by the PDCCH, where the RA-RNTI is (1+t_id+10*f_id+X)mod Y+1, where values of X and Y are integers; or the RA-RNTI is 65301+(10*t_id+f_id)mod 9, where t_id is a sequence number of a first subframe of a PRACH that is detected by the base station and that carries the random access preamble, 0≤t_id<10, f_id is a second PRACH index of a first subframe of the PRACH carrying the random access preamble, and 0≤f_id<6.

Compared with the prior art in which UE cannot correctly receive a message when a TTI for transmitting the message is directly reduced, in the technical solution provided in this embodiment of the present disclosure, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station. In addition, the UE may also send a message to the base station in the short TTI according to the transmission time unit indication information of the base station. In this way, a time length of a transmission time unit during information transmission is reduced, and further a random access time is reduced.

A fourth aspect of the present disclosure provides a random access apparatus, where the apparatus is applied to user equipment UE, and includes:

a sending unit, configured to send a random access preamble to a base station, where the random access preamble is used to indicate that the UE has a first transmission capability, and the first transmission capability is a capability of transmitting a transmission time unit of a first time length;

a receiving unit, configured to receive downlink control information DCI sent by the base station by using a physical downlink control channel PDCCH, where the DCI carries transmission time unit indication information and/or transport block indication information, the transmission time unit indication information is used to indicate a time length of a transmission time unit of a DL-SCH transport block and/or an uplink shared channel UL-SCH transport block, the time length of the transmission time unit is the first time length or a second time length, the second time length is greater than the first time length, and the transport block indication information includes DL-SCH transport block location information and/or UL-SCH transport block location information; and a processing unit, configured to: control the receiving unit to receive, according to the DCI, a random access response RAR that is for the random access preamble and that is sent by the base station according to the DL-SCH transport block indicated by the DCI; and control the sending unit to send a UL-SCH transport block according to uplink scheduling information carried by the RAR.

With reference to the fourth aspect, it should be noted that the processing unit is further configured to: the processing unit is further configured to: when the DCI carries the transmission time unit indication information, control the receiving unit to receive the DL-SCH transport block that carries the RAR for the random access preamble and that is sent by the base station, where the time length of the transmission time unit of the DL-SCH transport block is the time length indicated by the transmission time unit indication information, and the transmission time unit of the DL-SCH transport block is a transmission time unit adjacent to a transmission time unit of the PDCCH or a transmission time unit of the PDCCH; when the DCI carries the transport block indication information, control the receiving unit to receive, at a location indicated by the DL-SCH transport block location information indicated by the transport block indication information, the DL-SCH transport block that carries the RAR for the random access preamble and that is sent by the base station, where the time length of the transmission time unit of the DL-SCH transport block is a preset time length, and the DL-SCH transport block location information includes information about a time domain resource and/or a frequency domain resource of the DL-SCH transport block; or when the DCI carries the transmission time unit indication information and the transport block indication information, control the receiving unit to receive, at a location indicated by the DL-SCH transport block location information indicated by the transport block indication information, the DL-SCH transport block that carries the RAR for the random access preamble and that is sent by the base station, where the time length of the transmission time unit of the DL-SCH transport block is the time length indicated by the transmission time unit indication information.

With reference to the fourth aspect, it should be further noted that the processing unit is further configured to: when the DCI carries the transmission time unit indication information, control the sending unit to send, on a preset time domain resource of the UL-SCH transport block, the UL-SCH transport block to the base station according to the uplink scheduling information carried by the RAR and the transmission time unit indication information, where the time length of the transmission time unit of the UL-SCH transport block is the time length indicated by the transmission time unit indication information; when the DCI carries the transport block indication information, control the sending unit to send, at a location indicated by the UL-SCH transport block location information indicated by the transport block indication information, the UL-SCH transport block to the base station according to the uplink scheduling information carried by the RAR and the transport block indication information carried by the DCI, where the time length of the transmission time unit of the UL-SCH transport block is a preset time length, and the UL-SCH transport block location information includes information about a time domain resource and/or a frequency domain resource of the UL-SCH transport block; or when the DCI carries the transmission time unit indication information and the transport block indication information, control the sending unit to send, at a location indicated by the UL-SCH transport block location information indicated by the transport block indication information, the UL-SCH transport block to the base station according to the uplink scheduling information carried by the RAR and the transmission time unit indication information and the transport block indication information that are carried by the DCI, where the time length of the transmission time unit of the UL-SCH transport block is the time length indicated by the transmission time unit indication information.

Based on the fourth aspect, the processing unit includes:

a determining module, configured to determine a format of the received DCI received by the receiving unit; and an obtaining module, configured to: if the determining module determines that the format of the DCI is a first DCI format, obtain the transmission time unit indication information and/or the transport block indication information from the DCI, where the first DCI format is a DCI format to be detected only by the UE having the first transmission capability; if the format of the DCI is a DCI format 1A, obtain the transmission time unit indication information from bit information in an MCS bit field in the DCI; or if the format of the DCI is a DCI format 1C, obtain the transmission time unit indication information and/or the transport block indication information from bit information of a bit field in at least one of a new data indicator NDI bit field, a redundancy version RV bit field, and a MSB bit field of a TPC bit field in the DCI.

Based on the fourth aspect, the processing unit further includes a descrambling module, where the determining module is further configured to determine a random access radio network temporary identifier RA-RNTI, where the RA-RNTI is $(1+t\_id+10*f\_id+X) \bmod Y+1$, where values of X and Y are integers; or the RA-RNTI is $65301+(10*t\_id+f\_id) \bmod 9$, where t_id is a sequence number of a first subframe of a PRACH carrying the random access preamble, $0 \leq t\_id < 10$, f_id is a second PRACH index of a first subframe of the PRACH carrying the random access preamble, and $0 \leq f\_id < 6$; and the descrambling module is configured to descramble, according to the RA-RNTI determined by the determining module, the DCI carried by the PDCCH.

Compared with the prior art in which UE cannot correctly receive a message when a TTI for transmitting the message is directly reduced, in the technical solution provided in this embodiment of the present disclosure, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station, and send a message to the base station in the short TTI according to the transmission time unit indication information of the base station. In this way, a time length of a transmission time unit during information transmission is reduced, and further a random access time is reduced.

A fifth aspect of the present disclosure provides a base station, including:

a receiver, configured to receive a random access preamble sent by user equipment UE, where the random access preamble is used to indicate that the UE has a first transmission capability, and the first transmission capability is a capability of transmitting a transmission time unit of a first time length;

a transmitter, configured to send downlink control information DCI to the UE by using a physical downlink control channel PDCCH, where the DCI carries transmission time unit indication information and/or transport block indication information, the transmission time unit indication information is used to indicate a time length of a transmission time unit of a DL-SCH transport block and/or an uplink shared channel UL-SCH transport block, the time length of the transmission time unit is the first time length or a second time length, the second time length is greater than the first time length, and the transport block indication information includes DL-SCH transport block location information and/or UL-SCH transport block location information; and a processor, coupled to the receiver and the transmitter, configured to control execution of a program instruction, and specifically configured to control the transmitter to send a random access response RAR for the random access preamble to the UE by using the DL-SCH transport block indicated by the DCI, where the receiver is further configured to receive a UL-SCH transport block sent by the UE according to uplink scheduling information carried by the RAR.

With reference to the fifth aspect, it should be noted that the processor is further configured to: when the DCI carries the transmission time unit indication information, control the transmitter to send the DL-SCH transport block carrying the RAR for the random access preamble to the UE, where the time length of the transmission time unit of the DL-SCH transport block is the time length indicated by the transmission time unit indication information, and the transmission time unit of the DL-SCH transport block is a transmission time unit adjacent to a transmission time unit of the PDCCH or a transmission time unit of the PDCCH; when the DCI carries the transport block indication information, control the transmitter to send, at a location indicated by the DL-SCH transport block location information indicated by the transport block indication information, the DL-SCH transport block carrying the RAR for the random access preamble to the UE, where the time length of the transmission time unit of the DL-SCH transport block is a preset time length, and the DL-SCH transport block location information includes information about a time domain resource and/or a frequency domain resource of the DL-SCH transport block; or when the DCI carries the transmission time unit indication information and the transport block indication information, control the transmitter to send, at a location indicated by the DL-SCH transport block location information indicated by the transport block indication information, the DL-SCH transport block carrying the RAR for the random access preamble to the UE, where the time length of the transmission time unit of the DL-SCH transport block is the time length indicated by the transmission time unit indication information.

With reference to the fifth aspect, it should be further noted that the processor is further configured to: when the DCI carries the transmission time unit indication information, control the receiver to receive, according to the transmission time unit indication information on a preset time domain resource of the UL-SCH transport block, the UL-SCH transport block sent by the UE according to the uplink scheduling information carried by the RAR, where the time length of the transmission time unit of the UL-SCH transport block is the time length indicated by the transmission time unit indication information; when the DCI carries the transport block indication information, control the receiver to receive, according to the transport block indication information carried by the DCI, and at a location indicated by the UL-SCH transport block location information indicated by the transport block indication information, the UL-SCH transport block sent by the UE according to the uplink scheduling information carried by the RAR, where the UL-SCH transport block location information includes information about a time domain resource and/or a frequency domain resource of the UL-SCH transport block, and the time length of the transmission time unit of the UL-SCH transport block is a preset time length of the transmission time unit; or when the DCI carries the transmission time unit indication information and the transport block indication information, control the receiver to receive, according to the transmission time unit indication information and the transport block indication information that are carried by the DCI, and at a location indicated by the UL-SCH transport block location information indicated by the transport block indication information, the UL-SCH transport block sent by the UE according to the uplink scheduling information carried by the RAR, where the time length of the transmission time unit of the UL-SCH transport block is the time length indicated by the transmission time unit indication information.

Based on the fifth aspect, the processor is further configured to determine, according to the random access preamble received by the receiver, that a format of the DCI is a first DCI format, where the first DCI format is a DCI format to be detected only by the UE having the first transmission capability.

Based on the fifth aspect, optionally, the processor is further configured to determine, according to the random access preamble received by the receiver, that a format of the DCI is a DCI format 1A or a DCI format 1C, where a bit field used for carrying the transmission time unit indication information and/or the transport block indication information exists in each of the DCI format 1A and the DCI format 1C.

In a solution described according to the fifth aspect, if the format of the DCI is the DCI format 1A, bit information in an MCS bit field in the DCI is used to indicate the transmission time unit indication information; or if the format of the DCI is the DCI format 1C, bit information of a bit field in at least one of a new data indicator NDI bit field, a redundancy version RV bit field, and a MSB bit field of a TPC bit field in the DCI is used to indicate the transmission time unit indication information and/or the transport block indication information.

Based on the fifth aspect, the processor is further configured to scramble, according to a random access radio network temporary identifier RA-RNTI, the DCI carried by the PDCCH, where the RA-RNTI is $(1+t\_id+10*f\_id+X)$ mod $Y+1$, where values of X and Y are integers; or the RA-RNTI is $65301+(10*t\_id+f\_id)$mod 9, where t_id is a sequence number of a first sub frame of a PRACH that is detected by the base station and that carries the random access preamble, $0 \le t\_id < 10$, f_id is a second PRACH index of a first sub frame of the PRACH carrying the random access preamble, and $0 \le f\_id < 6$.

A sixth aspect of the present disclosure provides user equipment UE, including:

a transmitter, configured to send a random access preamble to a base station, where the random access preamble is used to indicate that the UE has a first transmission capability, and the first transmission capability is a capability of transmitting a transmission time unit of a first time length;

a receiver, configured to receive downlink control information DCI sent by the base station by using a physical downlink control channel PDCCH, where the DCI carries transmission time unit indication information and/or transport block indication information, the transmission time unit indication information is used to indicate a time length of a transmission time unit of a DL-SCH transport block and/or an uplink shared channel UL-SCH transport block, the time length of the transmission time unit is the first time length or a second time length, the second time length is greater than the first time length, and the transport block indication information includes DL-SCH transport block location information and/or UL-SCH transport block location information; and a processor, coupled to the transmitter and the receiver, configured to control execution of a program instruction, and specifically configured to: control the receiver to receive, according to the DCI, a random access response RAR that is for the random access preamble and that is sent by the base station according to the DL-SCH transport block indicated by the DCI; and control the transmitter to send a UL-SCH transport block according to uplink scheduling information carried by the RAR.

With reference to the sixth aspect, it should be noted that the processor is further configured to: when the DCI carries the transmission time unit indication information, control the receiver to receive the DL-SCH transport block that carries the RAR for the random access preamble and that is sent by the base station, where the time length of the transmission time unit of the DL-SCH transport block is the time length indicated by the transmission time unit indication information, and the transmission time unit of the DL-SCH transport block is a transmission time unit adjacent to a transmission time unit of the PDCCH or a transmission time unit of the PDCCH; when the DCI carries the transport block indication information, control the receiver to receive, at a location indicated by the DL-SCH transport block location information indicated by the transport block indication information, the DL-SCH transport block that carries the RAR for the random access preamble and that is sent by the base station, where the time length of the transmission time unit of the DL-SCH transport block is a preset time length, and the DL-SCH transport block location information includes information about a time domain resource and/or a frequency domain resource of the DL-SCH transport block; or when the DCI carries the transmission time unit indication information and the transport block indication information, control the receiver to receive, at a location indicated by the DL-SCH transport block location information indicated by the transport block indication information, the DL-SCH transport block that carries the RAR for the random access preamble and that is sent by the base station, where the time length of the transmission time unit of the DL-SCH transport block is the time length indicated by the transmission time unit indication information.

With reference to the sixth aspect, it should be further noted that the processor is further configured to: when the DCI carries the transmission time unit indication information, control the transmitter to send, on a preset time domain resource of the UL-SCH transport block, the UL-SCH transport block to the base station according to the uplink scheduling information carried by the RAR and the transmission time unit indication information, where the time length of the transmission time unit of the UL-SCH transport block is the time length indicated by the transmission time unit indication information; when the DCI carries the transport block indication information, control the transmitter to send, at a location indicated by the UL-SCH transport block location information indicated by the transport block indication information, the UL-SCH transport block to the base station according to the uplink scheduling information carried by the RAR and the transport block indication information carried by the DCI, where the time length of the transmission time unit of the UL-SCH transport block is a preset time length, and the UL-SCH transport block location information includes information about a time domain resource and/or a frequency domain resource of the UL-SCH transport block; or when the DCI carries the transmission time unit indication information and the transport block indication information, control the transmitter to send, at a location indicated by the UL-SCH transport block location information indicated by the transport block indication information, the UL-SCH transport block to the base station according to the uplink scheduling information carried by the RAR and the transmission time unit indication information and the transport block indication information that are carried by the DCI, where the time length of the transmission time unit of the UL-SCH transport block is the time length indicated by the transmission time unit indication information.

Based on the sixth aspect, the processor is further configured to: determine a format of the received DCI; and if the format of the DCI is a first DCI format, obtain the transmission time unit indication information and/or the transport block indication information from the DCI, where the first DCI format is a DCI format to be detected only by the UE having the first transmission capability; if the format of the DCI is a DCI format 1A, obtain the transmission time unit indication information from bit information in an MCS bit field in the DCI; or if the format of the DCI is a DCI format 1C, obtain the transmission time unit indication information and/or the transport block indication information from bit information of a bit field in at least one of a new data indicator (NDI) bit field, a redundancy version (RV) bit field, and a MSB bit field of a TPC bit field in the DCI.

In a solution described according to the sixth aspect, the processor is further configured to: determine a random access radio network temporary identifier RA-RNTI, where the RA-RNTI is $(1+t\_id+10*f\_id+X) \mod Y+1$, where values of X and Y are integers; or the RA-RNTI is $65301+(10*t\_id+f\_id) \mod 9$, where $t\_id$ is a sequence number of a first subframe of a PRACH carrying the random access preamble, $0 \leq t\_id < 10$, $f\_id$ is a second PRACH index of a first sub frame of the PRACH carrying the random access preamble, and $0 \leq f\_id < 6$; and descramble, according to the RA-RNTI, the DCI carried by the PDCCH.

According to the random access method and apparatus, the base station, and the UE that are provided in the embodiments of the present disclosure, the base station receives the random access preamble sent by the user equipment UE, where the random access preamble is used to indicate what the UE has the first transmission capability, the base station sends DCI to the UE by using the PDCCH, so that the UE can receive an RAR for the random access preamble according to the DCI, the base station sends the RAR for the random access preamble to the UE by using the DL-SCH transport block indicted by the DCI, and the base station receives the UL-SCH transport block sent by the UE according to the uplink scheduling information carried by the RAR. Compared with the prior art in which UE cannot correctly receive a message when a TTI for transmitting the message is directly reduced, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station. In addition, the UE may also send a message to the base station in the short TTI according to the transmission time unit indication information of the base station. In this way, a time length of a transmission time unit during information transmission is reduced, and further a random access time is reduced.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, "a plurality of" means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
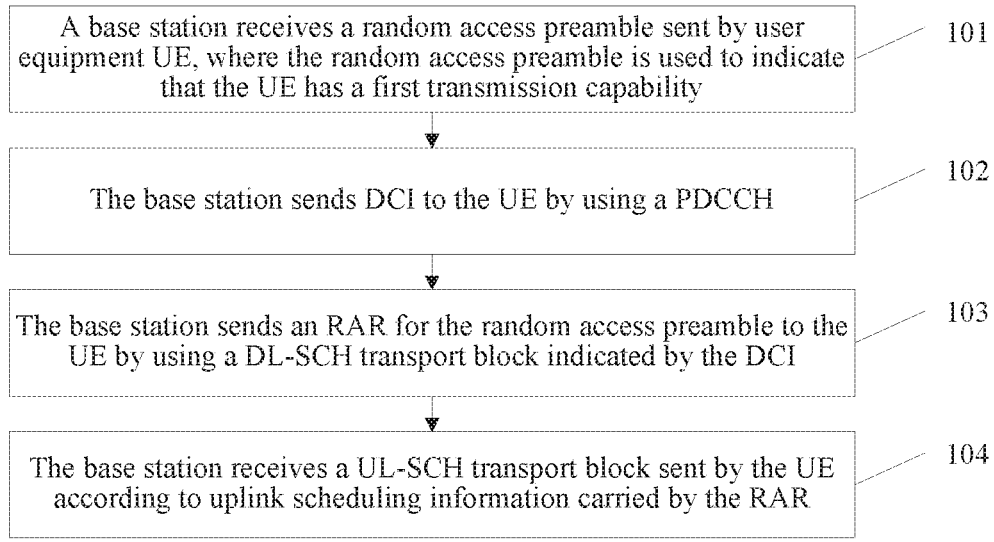
FIG. 1 is a flowchart of a random access method according to an embodiment of the present disclosure.

To reduce a random access time, an embodiment of the present disclosure provides a random access method. The method may be applied to an LTE or LTE-A scenario. As shown in FIG. 1, the method includes the following steps.

101. A base station receives a random access preamble sent by user equipment UE, where the random access preamble is used to indicate that the UE has a first transmission capability.

The first transmission capability is a capability of transmitting a transmission time unit of a first time length.

In a current LTE system, the base station and the UE transmit messages to each other by using a TTI of 1 ms as a basic transmission time unit. In this embodiment of the present disclosure, the transmission time unit of the first time length is a TTI of less than 1 ms. The first time length may specifically have a length of t SC-FDMA symbols or t OFDM symbols, where t is a positive integer less than or equal to 14.

For example, the first time length may be 0.5 ms, or may be less than 0.5 ms. For example, the first time length is one SC-FDMA symbol, two SC-FDMA symbols, three SC-FDMA symbols, four SC-FDMA symbols, five SC-FDMA symbols, six SC-FDMA symbols, seven SC-FDMA symbols, one OFDM symbol, two OFDM symbols, three OFDM symbols, four OFDM symbols, five OFDM symbols, six OFDM symbols, or seven OFDM symbols. For another example, the first time length may be 0.5 ms, 0.125 ms, or 0.1 ms.

Alternatively, the first transmission capability is a capability of transmitting a transmission time unit greater than, or greater than or equal to the first time length and less than, or less than or equal to the second time length. For example, the first time length is the foregoing examples, and the second time length is 1 ms.

102. The base station sends downlink control information (DCI) to the UE by using a physical downlink control channel (PDCCH).

The DCI carries transmission time unit indication information and/or transport block indication information.

The transmission time unit indication information is used to indicate a time length of a transmission time unit of a downlink shared channel (DL-SCH) transport block and/or a uplink shared channel (UL-SCH) transport block. The time length of the transmission time unit is the first time length or a second time length. The second time length is greater than the first time length.

For example, the transmission time unit of the second time length is a TTI of 1 ms, and the transmission time unit of the first time length is a TTI of less than 1 ms. Alternatively, the transmission time unit of the second time length may be a TTI of 0.5 ms, and the transmission time unit of the first time length may be a TTI of less than 0.5 ms. The transmission time unit of the second time length is not limited therein.

The transport block indication information includes DL-SCH transport block location information and/or UL-SCH transport block location information. The DL-SCH transport block location information includes information about a time domain resource and/or a frequency domain resource of the DL-SCH transport block. Similarly, the UL-SCH transport block location information includes information about a time domain resource and/or a frequency domain resource of the UL-SCH transport block.

The information about the time domain resource may be: a start symbol number of the UL-SCH transport block/the DL-SCH transport block in the transmission time unit of the first time length/the second time length, or an end symbol number of the UL-SCH transport block/the DL-SCH transport block in the transmission time unit of the first time length/the second time length, or a quantity of symbols of the UL-SCH transport block/the DL-SCH transport block in the transmission time unit of the first time length/the second time length. The information about the frequency domain resource may be: a number of a PRB, a subband, or a carrier of the UL-SCH transport block/the DL-SCH transport block in the transmission time unit of the first time length/the second time length.

It should be noted that the UE usually considers by default that the base station sends a message in a TTI of 1 ms. To enable the UE to correctly receive the RAR sent by the base station, in this step, the transmission time unit indication information included in the DCI sent by the base station to the UE may inform the UE of the time length of the transmission time unit when the base station sends the RAR, and the transport block indication information may inform the UE of the information about the time domain resource of the transport block that is sent by the base station and that is used for carrying the RAR and/or the information about the frequency domain resource of the transport block that is sent by the base station and that is used for carrying the RAR, so that the UE can receive the RAR according to the time length indicated by the DCI and/or receive the RAR at the location indicated by the DCI.

103. The base station sends an RAR for the random access preamble to the UE by using a DL-SCH transport block indicated by the DCI.

If the time length of the transmission time unit indicated by the transmission time unit indication information carried by the DCI is 0.5 ms, the base station sends, by using a TTI of 0.5 ms as the transmission time unit, the DL-SCH transport block carrying the RAR to the UE. It should be noted that the DL-SCH transport block may occupy all symbols in this transmission time unit temporally, or may occupy some symbols in this transmission time unit, but may not occupy any symbol outside this transmission time unit. The time length of the transmission time unit is not limited therein.

104. The base station receives a UL-SCH transport block sent by the UE according to uplink scheduling information carried by the RAR.

The uplink scheduling information carried by the RAR includes: a frequency hopping indication identifier, allocation of a resource block of a fixed size, a truncated modulation and coding scheme, a transmit power control command for a scheduled PUSCH, uplink delay indication information, or a CSI request.

According to the random access method provided in this embodiment of the present disclosure, the base station receives the random access preamble sent by the user equipment UE, where the random access preamble is used to indicate what the UE has the first transmission capability, the base station sends DCI to the UE by using the PDCCH, so that the UE can receive an RAR for the random access preamble according to the DCI, the base station sends the RAR for the random access preamble to the UE by using the DL-SCH transport block indicted by the DCI, and the base station receives the UL-SCH transport block sent by the UE according to the uplink scheduling information carried by the RAR. Compared with the prior art in which UE cannot correctly receive a message when a TTI for transmitting the message is directly reduced, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station. In addition, the UE may also send a message to the base station in the short TTI according to the transmission time unit indication information of the base station. In this way, a time length of a transmission time unit during information transmission is reduced, and further a random access time is reduced.

Because the DCI carries the transmission time unit indication information and/or the transport block indication information, there may be three cases for information carried by the DCI. In a first case, only the transmission time unit indication information is carried. In a second case, only the transport block indication information is carried. In a third case, both the transmission time unit indication information and the transport block indication information are carried. Corresponding to the three cases, in another implementation provided in this embodiment of the present disclosure, the foregoing step 103 of sending, by the base station, a random access response RAR for the random access preamble to the UE by using a DL-SCH transport block indicated by the DCI specifically includes the following three implementations.

A first implementation: When the DCI carries the transmission time unit indication information, the base station sends the DL-SCH transport block carrying the RAR for the random access preamble to the UE. The time length of the transmission time unit of the DL-SCH transport block is the time length indicated by the transmission time unit indication information.

To reduce a random access time, the time length indicated by the transmission time unit indication information may be the first time length. To ensure accuracy of random access, the time length indicated by the transmission time unit indication information may be the second time length.

It should be noted that in this embodiment of the present disclosure, the time length indicated by the transmission time unit indication information may be a time length of one transmission time unit, or may be a time length of a plurality of transmission time units.

The transmission time unit of the DL-SCH transport block is a transmission time unit adjacent to a transmission time unit of the PDCCH or a transmission time unit of the PDCCH.

A second implementation: When the DCI carries the transport block indication information, the base station sends, at a location indicated by the DL-SCH transport block location information indicated by the transport block indication information, the DL-SCH transport block carrying the RAR for the random access preamble to the UE. The time length of the transmission time unit of the DL-SCH transport block is a preset time length.

The DL-SCH transport block location information includes information about a time domain resource and/or a frequency domain resource of the DL-SCH transport block. To achieve the objective of reducing the random access time, a value range of the preset time length of the transmission time unit may be greater than or equal to the first time length and less than or equal to the second time length. For example, if the second, time length is 14 symbols (1 ms), and the first time length is one symbol, the preset time length of the transmission time unit is a symbol quantity ranging from 1 to 14, but cannot be greater than 14 or less than 1.

A third implementation: When the DCI carries the transmission time unit indication information and the transport block indication information, the base station sends, at a location indicated by the DL-SCH transport block location information indicated by the transport block indication information, the DL-SCH transport block carrying the RAR for the random access preamble to the UE. The time length of the transmission time unit of the DL-SCH transport block is the time length indicated by the transmission time unit indication information.

Moreover, in another implementation provided in this embodiment of the present disclosure, the foregoing step 104 of receiving, by the base station, a UL-SCH transport block sent by the UE according to uplink scheduling information carried by the RAR includes:

A first implementation: When the DCI carries the transmission time unit indication information, the base station receives, according to the transmission time unit indication information on a preset time domain resource of the UL-SCH transport block, the UL-SCH transport block sent by the UE according to the uplink scheduling information carried by the RAR, where the time length of the transmission time unit of the UL-SCH transport block is the time length indicated by the transmission time unit indication information.

In a specific implementation, when the DCI carries the transmission time unit indication information, the base station receives, according to the transmission time unit indication information and the uplink scheduling information carried by the RAR, on a frequency domain resource that is of the UL-SCH transport block and that is indicated by the uplink scheduling information and a preset time domain resource of the UL-SCH transport block, and by using the time length of the transmission time unit indicated by the transmission time unit indication information, the UL-SCH transport block sent by the UE according to the uplink scheduling information carried by the RAR.

To reduce a random access time, the time length indicated by the transmission time unit indication information may be the first time length. To ensure accuracy of random access, the time length indicated by the transmission time unit indication information may be the second time length.

It should be noted that the preset time domain resource of the UL-SCH transport block may be a time domain resource in a time length that is spaced apart from the DCI or the RAR by k first time lengths or k second time lengths, where k is a positive integer. The first time length or the second time length herein is determined according to the time length indicated by the transmission time unit indication information. For example, if the time length indicated by the transmission time unit indication information is the first time length, the preset time domain resource of the UL-SCH transport block may be a time domain resource in the first time length spaced apart from the DCI or the RAR by k first time lengths, where k is a positive integer.

A second implementation: When the DCI carries the transport block indication information, the base station receives, according to the transport block indication information carried by the DCI, and at a location indicated by the UL-SCH transport block location information indicated by the transport block indication information, the UL-SCH transport block sent by the UE according to the uplink scheduling information carried by the RAR, where the time length of the transmission time unit of the UL-SCH transport block is a preset time length of the transmission time unit.

The UL-SCH transport block location information includes information about a time domain resource and/or a frequency domain resource of the UL-SCH transport block. To achieve the objective of reducing the random access time, a value range of the preset time length of the transmission time unit may be greater than or equal to the first time length and less than or equal to the second time length. For example, if the second time length is 14 symbols (1 ms), and the first time length is one symbol, the preset time length of the transmission time unit is a symbol quantity ranging from 1 to 14, but cannot be greater than 14 or less than 1.

A third implementation: When the DCI carries the transmission time unit indication information and the transport block indication information, the base station receives, according to the transmission time unit indication information and the transport block indication information that are carried by the DCI, and at a location indicated by the UL-SCH transport block location information indicated by the transport block indication information, the UL-SCH transport block sent by the UE according to the uplink scheduling information carried by the RAR, where the time length of the transmission time unit of the UL-SCH transport block is the time length indicated by the transmission time unit indication information.

According to the random access method provided in this embodiment of the present disclosure, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station, and send a message to the base station in the short TTI according to the transmission time unit indication information of the base station. Therefore, the base station can also correctly receive, according to the transmission time unit indication information and/or the transport block indication information carried by the DCI, the UL-SCH transport block sent by the UE. In this way, a time length of a transmission time unit during information transmission is reduced, and further a random access time is reduced.

Figure 2:
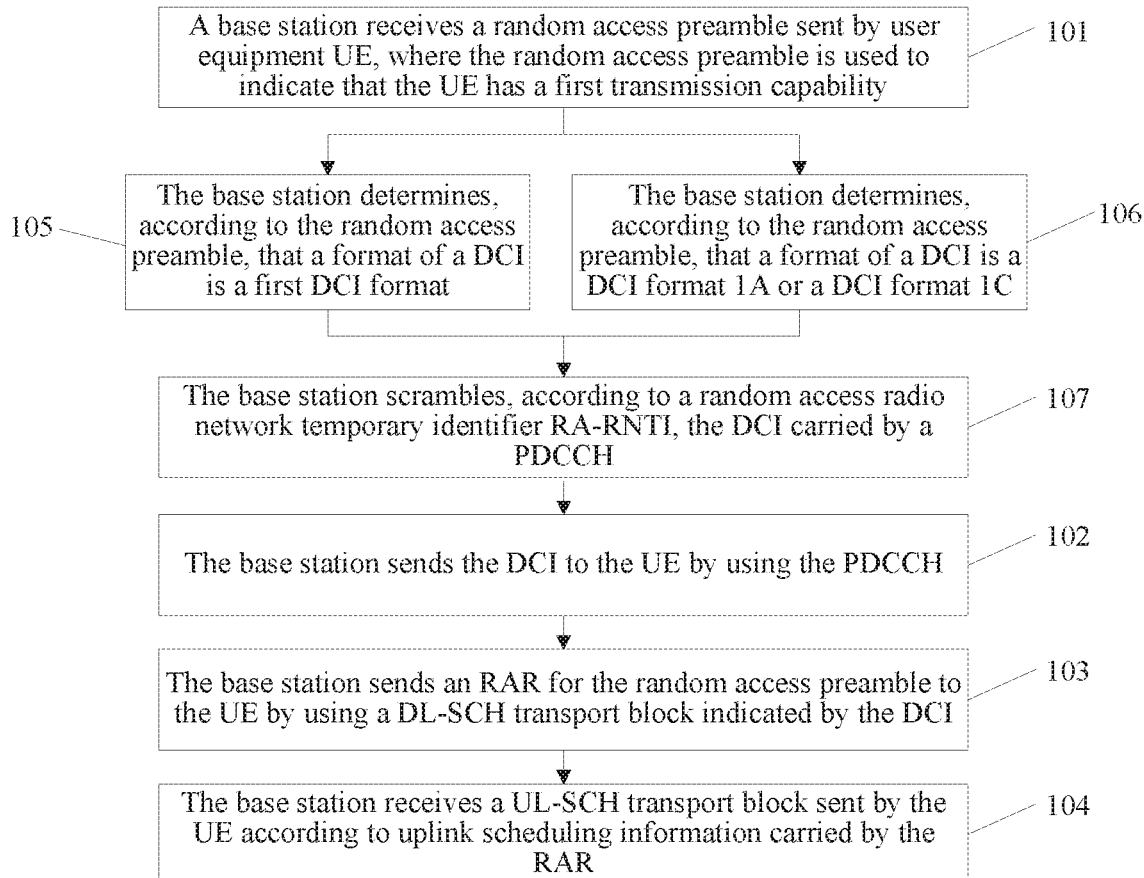
FIG. 2 is a flowchart of another random access method according to an embodiment of the present disclosure.

It should be noted that the transmission time indication information and/or the transport block indication information may be added to DCIs in different formats. Before the base station sends the DCI to the UE, a format of the DCI needs to be determined, to add the transmission time unit indication information and/or the transport block indication information to an appropriate location in the DCI. Based on this, in another implementation provided in this embodiment of the present disclosure, as shown in FIG. 2, before the foregoing step 102 of sending, by the base station, downlink control information DCI to the UE by using a PDCCH, the method further includes step 105 or step 106.

105. The base station determines, according to the random access preamble, that a format of the DCI is a first DCI format.

The first DCI format is a DCI format to be detected only by the UE having the first transmission capability.

It may be understood that the base station may send the DCI in the first DCI format and a DCI in another format. The DCI in the another format may be identified by older-version UE or UE that does not have the first transmission capability. The DCI in the first DCI format can be identified only by the UE having the first transmission capability. Therefore, after identifying the DCI in the first DCI format, the UE having the first transmission capability may receive a message and/or send a message according to the transmission time unit indication information and/or the transport block indication information carried by the DCI. Because the DCI in the other format does not include the transmission time unit indication information and/or the transport block indication information, if the UE receives the DCI in the another format, the UE sends a message by using a TTI of 1 ms as the transmission time unit by default.

Optionally, the UE having the first transmission capability may be caused to detect only the DCI in the first DCI format, without a need to detect a DCI in another format, preventing the UE from performing blind detection on the DCI in the another format.

106. The base station determines, according to the random access preamble, that a format of the DCI is a DCI format 1A or a DCI format 1C, where a bit field used for carrying the transmission time unit indication information and/or the transport block indication information exists in each of the DCI format 1A and the DCI format 1C.

It should be noted that both the DCI format 1A and the DCI format 1C are existing DCI formats. In this embodiment of the present disclosure, transmission time unit indication information and/or transport block indication information is added to a DCI in an existing format, but a total bit quantity of the DCI format 1A and the DCI format 1C is not increased. Because both the DCI format 1A and the DCI format 1C are DCI formats that can be identified by any UE, the UE does not perform additional blind detection.

If the format of the DCI is the DCI format 1A, bit information in an MCS bit field in the DCI is used to indicate the transmission time unit indication information.

If the format of the DCI is the DCI format 1C, bit information of a bit field in at least one of an NDI bit field, an RV bit field, and a MSB bit field of Transmitter Power Control (TPC) in the DCI is used to indicate the transmission time unit indication information and/or the transport block indication information. The NDI bit field, the RV bit field, and the MSB bit field of a TPC bit field are rarely used, and therefore may be used to carry the transmission time unit indication information and/or the transport block indication information without affecting information transmission. However, the transmission time unit indication information and/or the transport block indication information is not limited to being located in the foregoing bit field described by example.

In this embodiment of the present disclosure, the base station may flexibly instruct, depending on a status such as load on the base station, the UE to transmit a message by using the transmission time unit of the first time length or the transmission time unit of the second time length.

In addition, before the DCI is sent, the DCI further needs to be scrambled. To be specific, before the foregoing step 102 of sending, by the base station, downlink control information DCI to the UE by using a PDCCH, step 107 further needs to be performed.

107. The base station scrambles, according to a random access radio network temporary identifier RA-RNTI, the DCI carried by the PDCCH.

The RA-RNTI is (1+t_id+10*f_id+X)mod Y+1. Values of X and Y are integers. X and Y are parameters received by the UE having the first transmission capability from a system broadcast message. It should be noted, that only the UE having the first transmission capability can receive X and Y.

Alternatively, the RA-RNTI is 65301+(10*t_id+f_id)mod 9, where t_id is a sequence number of a first subframe of a PRACH that is detected, by the base station and that carries the random access preamble, 0≤t_id<10, f_id is a second PRACH index of a first subframe of the PRACH carrying the random access preamble, and 0≤f_id<6.

According to the random access method provided in this embodiment of the present disclosure, the base station receives the random access preamble sent by the user equipment UE, where the random access preamble is used to indicate what the UE has the first transmission capability, the base station sends DCI to the UE by using the PDCCH, so that the UE can receive an RAR for the random access preamble according to the DCI, the base station sends the RAR for the random access preamble to the UE by using the DL-SCH transport block indicted by the DCI, and the base station receives the UL-SCH transport block sent by the UE according to the uplink scheduling information carried by the RAR. Compared with the prior art in which UE cannot correctly receive a message when a TTI for transmitting the message is directly reduced, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station. In addition, the UE may also send a message to the base station in the short TTI according to the transmission time unit indication information of the base station. In this way, a time length of a transmission time unit during information transmission is reduced, and further a random access time is reduced.

Figure 3:
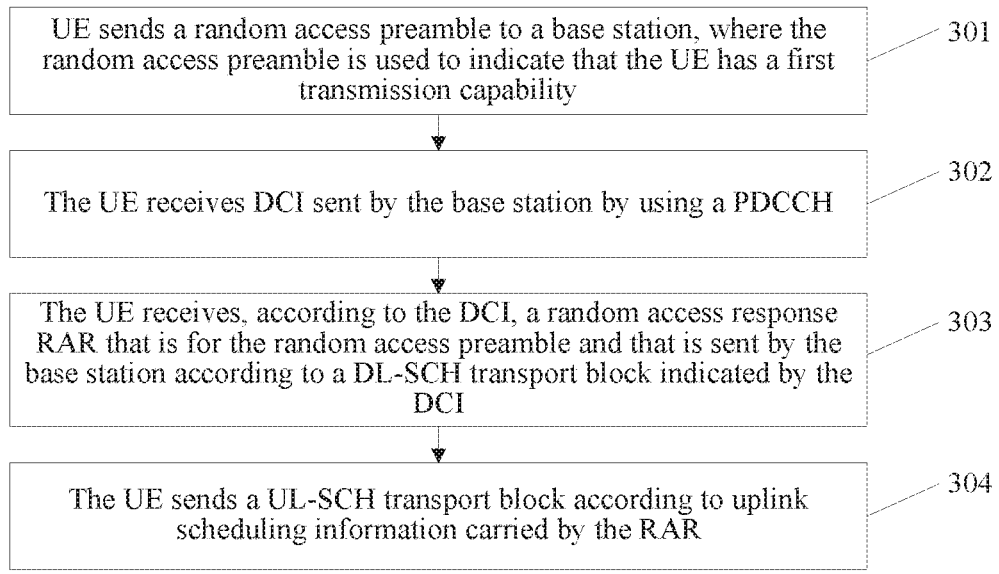
FIG. 3 is a flowchart of another random access method according to an embodiment of the present disclosure.

Corresponding to the foregoing embodiment, to reduce a random access time, an embodiment of the present disclosure provides a random access method. The method may be applied to an LTE or LTE-A scenario. As shown in FIG. 3, the method includes the following steps.

301. UE sends a random access preamble to a base station, where the random access preamble is used to indicate that the UE has a first transmission capability.

The first transmission capability is a capability of transmitting a transmission time unit of a first time length.

In a current LTE system, the base station and the UE transmit messages to each other by using a TTI of 1 ms as a basic transmission time unit. In this embodiment of the present disclosure, the transmission time unit of the first time length is a TTI of less than 1 ms. The first time length may specifically have a length of t SC-FDMA symbols or t OFDM symbols, where t is a positive integer less than or equal to 14.

For example, the first time length may be 0.5 ms, or may be less than 0.5 ms. For example, the first time length is one SC-FDMA symbol, two SC-FDMA symbols, three SC-FDMA symbols, four SC-FDMA symbols, five SC-FDMA symbols, six SC-FDMA symbols, seven SC-FDMA symbols, one OFDM symbol, two OFDM symbols, three OFDM symbols, four OFDM symbols, five OFDM symbols, six OFDM symbols, or seven OFDM symbols. For another example, the first time length may be 0.5 ms, 0.125 ms, or 0.1 ms.

Alternatively, the first transmission capability is a capability of transmitting a transmission time unit greater than, or greater than or equal to the first time length and less than, or less than or equal to the second time length. For example, the first time length is the foregoing examples, and the second time length is 1 ms.

302. The UE receives DCI sent by the base station by using a PDCCH.

The DCI carries transmission time unit indication information and/or transport block indication information. The transmission time unit indication information is used to indicate a time length of a transmission time unit of a DL-SCH transport block and/or an uplink shared channel UL-SCH transport block. The time length of the transmission time unit is the first time length or a second time length. The second time length is greater than the first time length.

The transport block indication information includes DL-SCH transport block location information and/or UL-SCH transport block location information. The DL-SCH transport block location information includes information about a time domain resource and/or a frequency domain resource of the DL-SCH transport block. Similarly, the UL-SCH transport block location information includes information about a time domain resource and/or a frequency domain resource of the UL-SCH transport block.

303. The UE receives, according to the DCI, a random access response RAR that is for the random access preamble and that is sent by the base station according to a DL-SCH transport block indicated by the DCI.

If the time length of the transmission time unit indicated by the transmission time unit indication information carried by the DCI is 0.5 ms, the UE receives, by using a TTI of 0.5 ms as the transmission time unit, the DL-SCH transport block carrying the RAR.

304. The UE sends a UL-SCH transport block according to uplink scheduling information carried by the RAR.

The uplink scheduling information carried by the RAR includes: a frequency hopping indication identifier, allocation of a resource block of a fixed size, a truncated modulation and coding scheme, a transmit power control command for a scheduled PUSCH, uplink delay indication information, or a CSI request.

According to the random access method provided in this embodiment of the present disclosure, the UE sends the random access preamble to the base station, where the random access preamble is used to indicate that the UE has the first transmission capability. The UE receives the DCI sent by the base station by using the PDCCH, receives, according to the DCI, the random access response RAR that is for the random access preamble and that is sent by the base station according to the DL-SCH transport block indicated by the DCI, and then sends the UL-SCH transport block according to the uplink scheduling information carried by the RAR. Compared with the prior art in which UE cannot correctly receive a message when a TTI for transmitting the message is directly reduced, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station, and send a message to the base station in the short TTI according to the transmission time unit indication information of the base station. In this way, a time length of a transmission time unit during information transmission is reduced, and further a random access time is reduced.

Because the DCI carries the transmission time unit indication information and/or the transport block indication information, there may be three cases for information carried by the DCI. In a first case, only the transmission time unit indication information is carried. In a second case, only the transport block indication information is carried. In a third case, both transmission time unit indication information and the transport block indication information are carried. Corresponding to the three cases, in another implementation provided in this embodiment of the present disclosure, the foregoing step 303 of receiving, by the UE according to the DCI, a random access response RAR that is for the random access preamble and that is sent by the base station according to the DL-SCH transport block indicated by the DCI specifically includes the following three implementations.

A first implementation: When the DCI carries the transmission time unit indication information, the UE receives the DL-SCH transport block that carries the RAR for the random access preamble and that is sent by the base station. The time length of the transmission time unit of the DL-SCH transport block is the time length indicated by the transmission time unit indication information.

To reduce a random access time, the time length indicated by the transmission time unit indication information may be the first time length. To ensure accuracy of random access, the time length indicated by the transmission time unit indication information may be the second time length.

The transmission time unit of the DL-SCH transport block is a transmission time unit adjacent to a transmission time unit of the PDCCH or a transmission time unit of the PDCCH.

A second implementation: When the DCI carries the transport block indication information, the UE receives, at a location indicated by the DL-SCH transport block location information indicated by the transport block indication information, the DL-SCH transport block that carries the RAR for the random access preamble and that is sent by the base station. The time length of the transmission time unit of the DL-SCH transport block is a preset time length.

The DL-SCH transport block location information includes information about a time domain resource and/or a frequency domain resource of the DL-SCH transport block. To achieve the objective of reducing the random access time, a value range of the preset time length of the transmission time unit may be greater than or equal to the first time length and less than or equal to the second time length. For example, if the second time length is 14 symbols (1 ms), and the first time length is one symbol, the preset time length of the transmission time unit is a symbol quantity ranging from 1 to 14, but cannot be greater than 14 or less than 1.

A third implementation: When the DCI carries the transmission time unit indication information and the transport block indication information, the UE receives, at a location indicated by the DL-SCH transport block location information indicated by the transport block indication information, the DL-SCH transport block that carries the RAR for the random access preamble and that is sent by the base station. The time length of the transmission time unit of the DL-SCH transport block is the time length indicated by the transmission time unit indication information.

In another implementation provided in this embodiment of the present disclosure, the foregoing step 304 of sending, by the UE, a UL-SCH transport block according to uplink scheduling information carried by the RAR specifically includes:

A first implementation: When the DCI carries the transmission time unit indication information, the UE sends, on a preset time domain resource of the UL-SCH transport block, the UL-SCH transport block to the base station according to the uplink scheduling information carried by the RAR and the transmission time unit indication information. The time length of the transmission time unit of the UL-SCH transport block is the time length indicated by the transmission time unit indication information.

In a specific implementation, when the DCI carries the transmission time unit indication information, the UE sends the UL-SCH transport block to the base station according to the uplink scheduling information carried by the RAR and the transmission time unit indication information, on a frequency domain resource that is of the UL-SCH transport block and that is indicated by the uplink scheduling information and a preset time domain resource of the UL-SCH transport block, and by using the time length of the transmission time unit indicated by the transmission time unit indication information.

To reduce a random access time, the time length indicated by the transmission time unit indication information may be the first time length. To ensure accuracy of random access, the time length indicated by the transmission time unit indication information may be the second time length.

It should be noted that the preset time domain resource of the UL-SCH transport block may be a time domain resource in a time length that is spaced apart from the DCI or the RAR by k first time lengths or k second time lengths, where k is a positive integer. The first time length or the second time length herein is determined according to the time length indicated by the transmission time unit indication information. For example, if the time length indicated by the transmission time unit indication information is the first time length, the preset time domain resource of the UL-SCH transport block may be a time domain resource in the first time length spaced apart from the DCI or the RAR by k first time lengths, where k is a positive integer.

A second implementation: When the DCI carries the transport block indication information, the UE sends, at a location indicated by the UL-SCH transport block location information indicated by the transport block indication information, the UL-SCH transport block to the base station according to the uplink scheduling information carried by the RAR and the transport block indication information carried by the DCI. The time length of the transmission time unit of the UL-SCH transport block is a preset time length.

The UL-SCH transport block location information includes information about a time domain resource and/or a frequency domain resource of the UL-SCH transport block. To achieve the objective of reducing the random access time, a value range of the preset time length of the transmission time unit may be greater than or equal to the first time length and less than or equal to the second time length. For example, if the second time length is 14 symbols (1 ms), and the first time length is one symbol, the preset time length of the transmission time unit is a symbol quantity ranging from 1 to 14, but cannot be greater than 14 or less than 1.

A third implementation: When the DCI carries the transmission time unit indication information and the transport block indication information, the UE sends, at a location indicated by the UL-SCH transport block location information indicated by the transport block indication information, the UL-SCH transport block to the base station according to the uplink scheduling information carried by the RAR and the transmission time unit indication information and the transport block indication information that are carried by the DCI. The time length of the transmission time unit of the UL-SCH transport block is the time length indicated by the transmission time unit indication information.

According to the random access method provided in this embodiment of the present disclosure, because the DCI carries the transmission time unit indication information, and the transmission time unit indication information and/or the transport block indication information may indicate that the UE sends a message to the base station in a short TTI, the base station can also correctly receive, according to the transmission time unit indication information and/or the transport block indication information carried by the DCI, the UL-SCH transport block sent by the UE. In this way, a time length of a transmission time unit during information transmission is reduced, and further a random access time is reduced.

Figure 4:
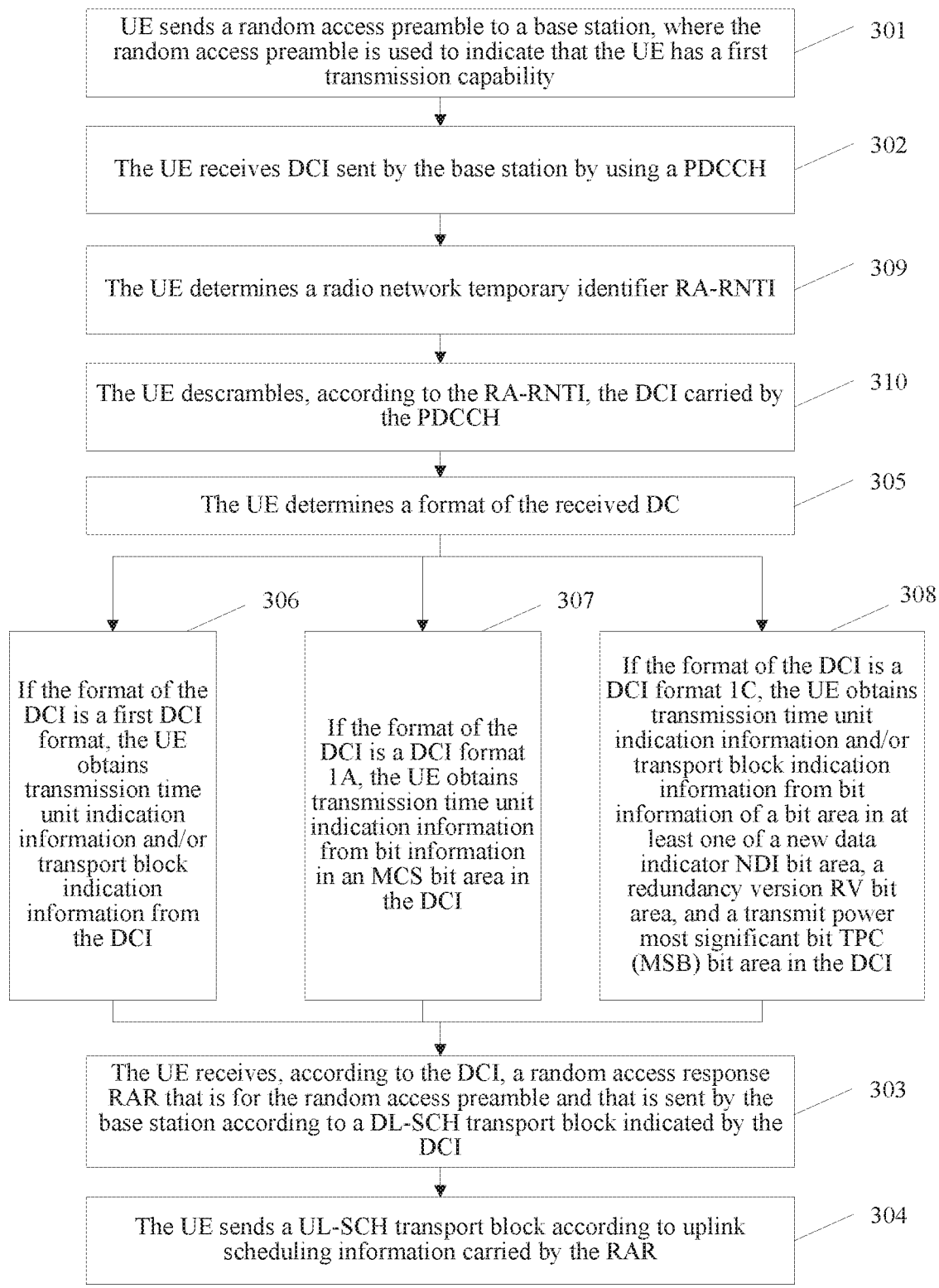
FIG. 4 is a flowchart of another random access method according to an embodiment of the present disclosure.

It should be noted that the transmission time indication information and/or the transport block indication information may be added to DCIs in different formats. Before the UE receives the DCI sent by the base station, a format of the DCI needs to be determined, to determine a location that is in the DCI and from which the transmission time unit indication information and/or the transport block indication information are to be obtained. Based on this, in another implementation provided in this embodiment of the present disclosure, as shown in FIG. 4, before the foregoing step 302 of receiving, by the UE, DCI sent by the base station by using a PDCCH, the method further includes the following steps.

305. The UE determines a format of the received DCI.

306. If the format of the DCI is a first DCI format, the UE obtains the transmission time unit indication information and/or the transport block indication information from the DCI.

The first DCI format is a DCI format to be detected only by the UE having the first transmission capability.

It should be noted that when the format of the DCI is the first DCI format, the UE having the first transmission capability identifies only the DCI in the first DCI format, and older-version UE or UE that does not have the first transmission capability identifies a DCI in another format. Because the DCI in the first DCI format is to be identified only by the UE having the first transmission capability, and the format of the DCI is determined by the base station according to the random access preamble sent by the UE, the UE having the first transmission capability may directly obtain the transmission time unit indication information and/or the transport block indication information from the DCI.

Optionally, the UE having the first transmission capability may be caused to detect only the DCI in the first DCI format, without a need to detect a DCI in another format, preventing the UE from performing blind detection on the DCI in the another format.

307. If the format of the DCI is a DCI format 1A, the UE obtains the transmission time unit indication information from bit information in an MCS bit field in the DCI.

308. If the format of the DCI is a DCI format 1C, the UE obtains the transmission time unit indication information and/or the transport block indication information from bit information of a bit field in at least one of a new data indicator NDI bit field, a redundancy version RV bit field, and a MSB bit field of a TPC bit field in the DCI.

The NDI bit field, the redundancy version RV bit field, and the MSB bit field of a TPC bit field are rarely used, and therefore may be used to carry the transmission time unit indication information and/or the transport block indication information without affecting information transmission. However, the transmission time unit indication information and/or the transport block indication information is not limited to being located in the foregoing bit field described by example.

It should be noted that both the DCI format 1A and the DCI format 1C are existing DCI formats. In this embodiment of the present disclosure, transmission time unit indication information and/or transport block indication information is added to a DCI in an existing format, but a total bit quantity of the DCI format 1A and the DCI format 1C is not increased. Because both the DCI format 1A and the DCI format 1C are DCI formats that can be identified by any UE, the UE does not perform additional blind detection.

Before sending the DCI to the UE by using the PDCCH, the base station scrambles the DCI carried by the PDCCH. Therefore, after receiving the DCI sent by the base station by using the PDCCH, the UE further needs to perform a descrambling operation. To be specific, after the foregoing step 302 of receiving, by the UE, DCI sent by the base station by using a PDCCH, step 309 and step 310 further need to be performed.

309. The UE determines a random access radio network temporary identifier RA-RNTI.

The RA-RNTI is $(1+t\_id+10*f\_id+X) \bmod Y+1$, where values of X and Y are integers; or the RA-RNTI is $65301+(10*t\_id+f\_id) \bmod 9$, where t_id is a sequence number of a first subframe of a PRACH carrying the random access preamble, $0 \le t\_id < 10$, f_id is a second PRACH index of a first subframe of the PRACH carrying the random access preamble, and $0 \le f\_id < 6$.

310. The UE descrambles, according to the RA-RNTI, the DCI carried by the PDCCH.

According to the random access method provided in this embodiment of the present disclosure, the UE sends the random access preamble to the base station, where the random access preamble is used to indicate that the UE has the first transmission capability. The UE receives the DCI sent by the base station by using the PDCCH, receives, according to the DCI, the random access response RAR that is for the random access preamble and that is sent by the base station according to the DL-SCH transport block indicated by the DCI, and then sends the UL-SCH transport block according to the uplink scheduling information carried by the RAR. Compared with the prior art in which UE cannot correctly receive a message when a TTI for transmitting the message is directly reduced, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station, and send a message to the base station in the short TTI according to the transmission time unit indication information of the base station. In this way, a time length of a transmission time unit during information transmission is reduced, and further a random access time is reduced.

Figure 5:
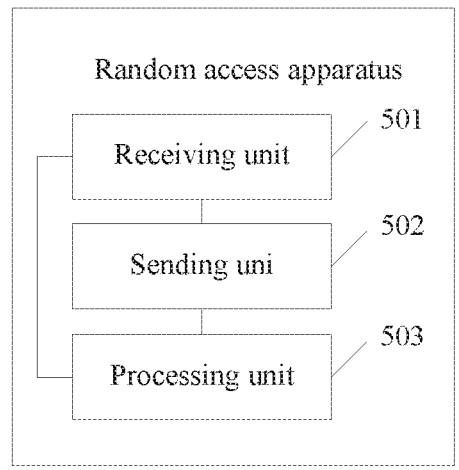
FIG. 5 is a schematic logic structural diagram of a random access apparatus according to an embodiment of the present disclosure.

With reference to the foregoing method embodiment, to reduce a random access time, an embodiment of the present disclosure further provides a random access apparatus. The apparatus is applied to a base station. As shown in FIG. 5, the apparatus includes a receiving unit 501, a sending unit 502, and a processing unit 503.

The receiving unit 501 is configured to receive a random access preamble sent by user equipment UE, where the random access preamble is used to indicate that the UE has a first transmission capability, and the first transmission capability is a capability of transmitting a transmission time unit of a first time length.

The sending unit 502 is configured to: send downlink control information DCI to the UE by using a physical downlink control channel PDCCH, where the DCI carries transmission time unit indication information and/or transport block indication information, the transmission time unit indication information is used to indicate a time length of a transmission time unit of a DL-SCH transport block and/or an uplink shared channel UL-SCH transport block, the time length of the transmission time unit is the first time length or a second time length, the second time length is greater than the first time length, and the transport block indication information includes DL-SCH transport block location information and/or UL-SCH transport block location information; and send a random access response RAR for the random access preamble to the UE by using the DL-SCH transport block indicated by the DCI.

The processing unit 503 is configured to control the receiving unit 501 to receive a UL-SCH transport block sent by the UE according to uplink scheduling information carried by the RAR.

Compared with the prior art in which UE cannot correctly receive a message when a TTI for transmitting the message is directly reduced, for the random access apparatus provided in this embodiment of the present disclosure, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station. In addition, the UE may also send a message to the base station in the short TTI according to the transmission time unit indication information of the base station. In this way, a time length of a transmission time unit during information transmission is reduced, and further a random access time is reduced.

In another embodiment of the present disclosure, the processing unit 503 is further configured to: when the DCI carries the transmission time unit indication information, control the sending unit 502 to send the DL-SCH transport block carrying the RAR for the random access preamble to the UE, where the time length of the transmission time unit of the DL-SCH transport block is the time length indicated by the transmission time unit indication information, and the transmission time unit of the DL-SCH transport block is a transmission time unit adjacent to a transmission time unit of the PDCCH or a transmission time unit of the PDCCH; when the DCI carries the transport block indication information, control the sending unit 502 to send, at a location indicated by the DL-SCH transport block location information indicated by the transport block indication information, the DL-SCH transport block carrying the RAR for the random access preamble to the UE, where the time length of the transmission time unit of the DL-SCH transport block is a preset time length, and the DL-SCH transport block location information includes information about a time domain resource and/or a frequency domain resource of the DL-SCH transport block; or when the DCI carries the transmission time unit indication information and the transport block indication information, control the sending unit 502 to send, at a location indicated by the DL-SCH transport block location information indicated by the transport block indication information, the DL-SCH transport block carrying the RAR for the random access preamble to the UE, where the time length of the transmission time unit of the DL-SCH transport block is the time length indicated by the transmission time unit indication information.

In another embodiment of the present disclosure, the processing unit 503 is further configured to: when the DCI carries the transmission time unit indication information, control the receiving unit 501 to receive, according to the transmission time unit indication information on a preset time domain resource of the UL-SCH transport block, the UL-SCH transport block sent by the UE according to the uplink scheduling information carried by the RAR, where the time length of the transmission time unit of the UL-SCH transport block is the time length indicated by the transmission time unit indication information; when the DCI carries the transport block indication information, control the receiving unit 501 to receive, according to the transport block indication information carried by the DCI, and at a location indicated by the UL-SCH transport block location information indicated by the transport block indication information, the UL-SCH transport block sent by the UE according to the uplink scheduling information carried by the RAR, where the UL-SCH transport block location information includes information about a time domain resource and/or a frequency domain resource of the UL-SCH transport block, and the time length of the transmission time unit of the UL-SCH transport block is a preset time length of the transmission time unit; or when the DCI carries the transmission time unit indication information and the transport block indication information, control the receiving unit 501 to receive, according to the transmission time unit indication information and the transport block indication information that are carried by the DCI, and at a location indicated by the UL-SCH transport block location information indicated by the transport block indication information, the UL-SCH transport block sent by the UE according to the uplink scheduling information carried by the RAR, where the time length of the transmission time unit of the UL-SCH transport block is the time length indicated by the transmission time unit indication information.

In this embodiment of the present disclosure, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station, and send a message to the base station in the short TTI according to the transmission time unit indication information of the base station. Therefore, the base station can also correctly receive, according to the transmission time unit indication information and/or the transport block indication information carried by the DCI, the UL-SCH transport block sent by the UE. In this way, a time length of a transmission time unit during information transmission is reduced, and further a random access time is reduced.

Figure 6:
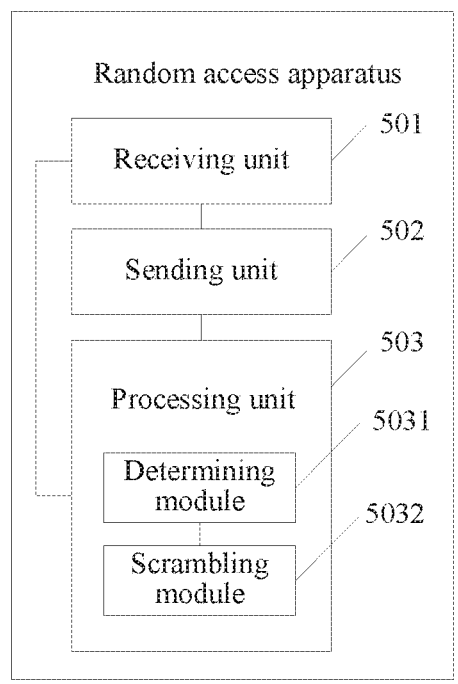
FIG. 6 is a schematic logic structural diagram of another random access apparatus according to an embodiment of the present disclosure.

In another embodiment of the present disclosure, as shown in FIG. 6, the processing unit 503 includes a determining module 5031 and a scrambling module 5032.

The determining module 5031 is configured to determine, according to the random access preamble received by the receiving unit 501, that a format of the DCI is a first DCI format, where the first DCI format is a DCI format to be detected only by the UE having the first transmission capability.

The determining module 5031 is further configured to determine, according to the random access preamble received by the receiving unit 501, that a format of the DCI is a DCI format 1A or a DCI format 1C, where a bit field used for carrying the transmission time unit indication information and/or the transport block indication information exists in each of the DCI format 1A and the DCI format 1C.

If the format of the DCI is the DCI format 1A, bit information in an MCS bit field in the DCI is used to indicate the transmission time unit indication information.

If the format of the DCI is the DCI format 1C, bit information of a bit field in at least one of a new data indicator NDI bit field, a redundancy version RV bit field, and a MSB bit field of a TPC bit field in the DCI is used to indicate the transmission time unit indication information and/or the transport block indication information.

The scrambling module 5032 is configured to scramble, according to a random access radio network temporary identifier RA-RNTI, the DCI carried by the PDCCH, where the RA-RNTI is (1+t_id+10*f_id+X)mod Y+1, where values of X and Y are integers; or the RA-RNTI is 65301+(10*t_id+f_id)mod 9, where t_id is a sequence number of a first subframe of a PRACH that is detected by the base station and that carries the random access preamble, 0≤t_id<10, f_id is a second PRACH index of a first subframe of the PRACH carrying the random access preamble, and 0≤f_id<6.

According to the random access apparatus provided in this embodiment of the present disclosure, the receiving unit receives the random access preamble sent by the user equipment UE, where the random access preamble is used to indicate that the UE has the first transmission capability. The sending unit sends the DCI to the UE by using the PDCCH, so that the UE can receive the RAR for the random access preamble according to the DCI; and sends the RAR for the random access preamble to the UE by using the DL-SCH transport block indicated by the DCI. Then the receiving unit receives the UL-SCH transport block sent by the UE according to the uplink scheduling information carried by the RAR. Compared with the prior art in which UE cannot correctly receive a message when a TTI for transmitting the message is directly reduced, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station. In addition, the UE may also send a message to the base station in the short TTI according to the transmission time unit indication information of the base station. In this way, a time length of a transmission time unit during information transmission is reduced, and further a random access time is reduced.

Figure 7:
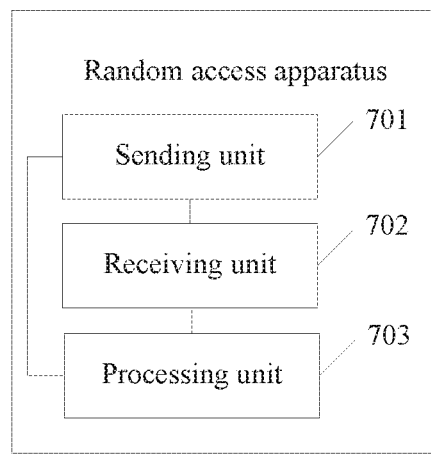
FIG. 7 is a schematic logic structural diagram of another random access apparatus according to an embodiment of the present disclosure.

To reduce a random access time, an embodiment of the present disclosure further provides a random access apparatus. The apparatus is applied to user equipment UE. As shown in FIG. 7, the apparatus includes a sending unit 701, a receiving unit 702, and a processing unit 703.

The sending unit 701 is configured to send a random access preamble to a base station, where the random access preamble is used to indicate that the UE has a first transmission capability, and the first transmission capability is a capability of transmitting a transmission time unit of a first time length.

The receiving unit 702 is configured to receive downlink control information DCI sent by the base station by using a physical downlink control channel PDCCH, where the DCI carries transmission time unit indication information and/or transport block indication information, the transmission time unit indication information is used to indicate a time length of a transmission time unit of a DL-SCH transport block and/or an uplink shared channel UL-SCH transport block, the time length of the transmission time unit is the first time length or a second time length, the second time length is greater than the first time length, and the transport block indication information includes DL-SCH transport block location information and/or UL-SCH transport block location information.

The processing unit 703 is configured to: control the receiving unit 702 to receive, according to the DCI, a random access response RAR that is for the random access preamble and that is sent by the base station according to the DL-SCH transport block indicated by the DCI; and control the sending unit 701 to send a UL-SCH transport block according to uplink scheduling information carried by the RAR.

Compared with the prior art in which UE cannot correctly receive a message when a TTI for transmitting the message is directly reduced, for the random access apparatus provided in this embodiment of the present disclosure, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station, and send a message to the base station in the short TTI according to the transmission time unit indication information of the base station. In this way, a time length of a transmission time unit during information transmission is reduced, and further a random access time is reduced.

In another embodiment of the present disclosure, the processing unit 703 is further configured to: when the DCI carries the transmission time unit indication information, control the receiving unit 702 to receive the DL-SCH transport block that carries the RAR for the random access preamble and that is sent by the base station, where the time length of the transmission time unit of the DL-SCH transport block is the time length indicated by the transmission time unit indication information, and the transmission time unit of the DL-SCH transport block is a transmission time unit adjacent to a transmission time unit of the PDCCH or a transmission time unit of the PDCCH; when the DCI carries the transport block indication information, control the receiving unit 702 to receive, at a location indicated by the DL-SCH transport block location information indicated by the transport block indication information, the DL-SCH transport block that carries the RAR for the random access preamble and that is sent by the base station, where the time length of the transmission time unit of the DL-SCH transport block is a preset time length, and the DL-SCH transport block location information includes information about a time domain resource and/or a frequency domain resource of the DL-SCH transport block; or when the DCI carries the transmission time unit indication information and the transport block indication information, control the receiving unit 702 to receive, at a location indicated by the DL-SCH transport block location information indicated by the transport block indication information, the DL-SCH transport block that carries the RAR for the random access preamble and that is sent by the base station, where the time length of the transmission time unit of the DL-SCH transport block is the time length indicated by the transmission time unit indication information.

In another embodiment of the present disclosure, the processing unit 703 is further configured to: when the DCI carries the transmission time unit indication information, control the sending unit 701 to send, on a preset time domain resource of the UL-SCH transport block, the UL-SCH transport block to the base station according to the uplink scheduling information carried by the RAR and the transmission time unit indication information, where the time length of the transmission time unit of the UL-SCH transport block is the time length indicated by the transmission time unit indication information; when the DCI carries the transport block indication information, control the sending unit 701 to send, at a location indicated by the UL-SCH transport block location information indicated by the transport block indication information, the UL-SCH transport block to the base station according to the uplink scheduling information carried by the RAR and the transport block indication information carried by the DCI, where the time length of the transmission time unit of the UL-SCH transport block is a preset time length, and the UL-SCH transport block location information includes information about a time domain resource and/or a frequency domain resource of the UL-SCH transport block; or when the DCI carries the transmission time unit indication information and the transport block indication information, control the sending unit 701 to send, at a location indicated by the UL-SCH transport block location information indicated by the transport block indication information, the UL-SCH transport block to the base station according to the uplink scheduling information carried by the RAR and the transmission time unit indication information and the transport block indication information that are carried by the DCI, where the time length of the transmission time unit of the UL-SCH transport block is the time length indicated by the transmission time unit indication information.

In this embodiment of the present disclosure, because the DCI carries the transmission time unit indication information, and the transmission time unit indication information and/or the transport block indication information may indicate that the UE sends a message to the base station in a short TTI, the base station can also correctly receive, according to the transmission time unit indication information and/or the transport block indication information carried by the DCI, the UL-SCH transport block sent by the UE. In this way, a time length of a transmission time unit during information transmission is reduced, and further a random access time is reduced.

Figure 8:
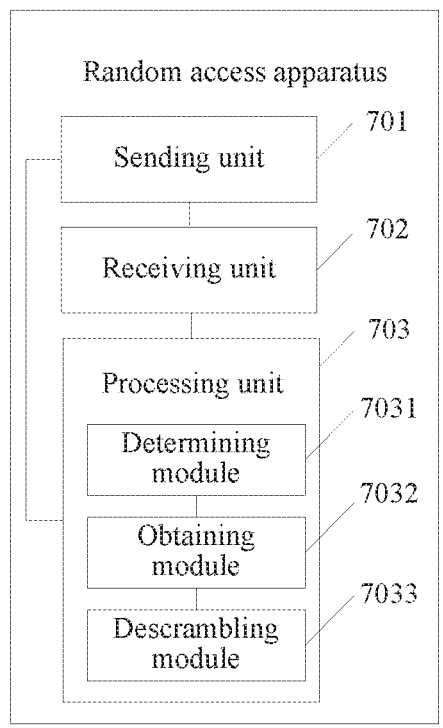
FIG. 8 is a schematic logic structural diagram of another random access apparatus according to an embodiment of the present disclosure.

In another embodiment of the present disclosure, as shown in FIG. 8, the processing unit 703 includes a determining module 7031, an obtaining module 7032, and a descrambling module 7033.

The determining module 7031 is configured to determine a format of the received DCI received by the receiving unit 702.

The obtaining module 7032 is configured to: if the determining module 7031 determines that the format of the DCI is a first DCI format, obtain the transmission time unit indication information and/or the transport block indication information from the DCI, where the first DCI format is a DCI format to be detected only by the UE having the first transmission capability; if the format of the DCI is a DCI format 1A, obtain the transmission time unit indication information from bit information in an MCS bit field in the DCI; or if the format of the DCI is a DCI format 1C, obtain the transmission time unit indication information and/or the transport block indication information from bit information of a bit field in at least one of a new data indicator NDI bit field, a redundancy version RV bit field, and a MSB bit field of a TPC bit field in the DCI.

The determining module 7031 is further configured to determine a random access radio network temporary identifier RA-RNTI, where the RA-RNTI is $(1+t\_id+10*f\_id+X)\bmod Y+1$, where values of X and Y are integers; or the RA-RNTI is $65301+(10*t\_id+f\_id)\bmod 9$, where $t\_id$ is a sequence number of a first subframe of a PRACH carrying the random access preamble, $0 \le t\_id < 10$, $f\_id$ is a second PRACH index of a first subframe of the PRACH carrying the random access preamble, and $0 \le f\_id < 6$.

The descrambling module 7033 is configured to descramble, according to the RA-RNTI determined by the determining module 7031, the DCI carried by the PDCCH.

According to the random access apparatus provided in this embodiment of the present disclosure, the sending unit sends the random access preamble to the base station, where the random access preamble is used to indicate that the UE has the first transmission capability. The receiving unit receives the DCI sent by the base station by using the PDCCH, and receives, according to the DCI, the random access response RAR that is for the random access preamble and that is sent by the base station according to the DL-SCH transport block indicated by the DCI. Then the sending unit sends the UL-SCH transport block according to the uplink scheduling information carried by the RAR. Compared with the prior art in which UE cannot correctly receive a message when a TTI for transmitting the message is directly reduced, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station, and send a message to the base station in the short TTI according to the transmission time unit indication information of the base station. In this way, a time length of a transmission time unit during information transmission is reduced, and further a random access time is reduced.

Figure 9:
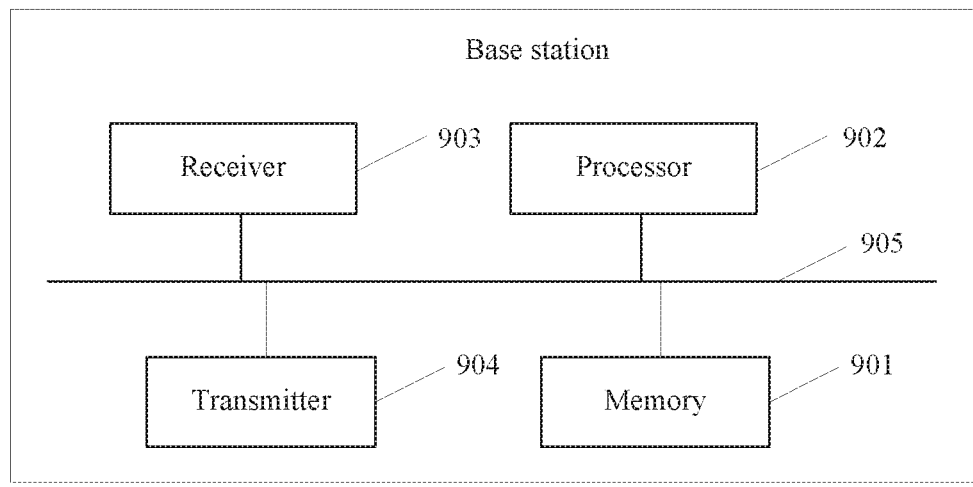
FIG. 9 is a schematic logic structural diagram of a base station in a random access method according to an embodiment of the present disclosure.

An embodiment of the present disclosure further provides a random access apparatus. As shown in FIG. 9, the apparatus is a schematic structural diagram of hardware of a base station described in FIG. 5 and FIG. 6. The base station may include a memory 901, a processor 902, a receiver 903, a transmitter 904, and a bus 905.

The memory 901 may be a read-only memory (ROM), a static storage device, a dynamic storage device, or a random access memory (RAM). The memory 901 may store an operating system, and another application program. During implementation of the technical solution provided in this embodiment of the present disclosure by using software or firmware, program code for implementing the technical solution provided in this embodiment of the present disclosure is stored in the memory 901 and is executed by the processor 902.

The receiver 903 is configured to implement communication between the apparatus and another device or a communications network (for example, but not limited to, the Ethernet, a radio access network (RAN), or a wireless local area network (WLAN).

The processor 902 may be a general central processing unit (CPU), a microprocessor, an application-specific integrated circuit (ASIC), or one or more integrated circuits, to execute a related program to implement the technical solution provided in this embodiment of the present disclosure.

The bus 905 may include a channel for transmitting information between components (such as the memory 901, the receiver 903, the transmitter 904, and the processor 902) of the apparatus.

It should be noted that although the hardware shown in FIG. 9 shows only the memory 901, the receiver 903, the transmitter 904, the processor 902, and the bus 904, in a specific implementation process, a person skilled in the art should understand that the apparatus further includes another device that is necessary for implementing normal running. In addition, a person skilled in the art should understand that according to a specific requirement, the terminal may further include a hardware device for implementing another function.

Specifically, when the base station shown in FIG. 9 is configured to implement the apparatuses shown in the embodiments of FIG. 5 and FIG. 6, the receiver 903 in the apparatus is configured to receive a random access preamble sent by user equipment UE, where the random access preamble is used to indicate that the UE has a first transmission capability, and the first transmission capability is a capability of transmitting a transmission time unit of a first time length.

The transmitter 904 is configured to send downlink control information DCI to the UE by using a physical downlink control channel PDCCH, where the DCI carries transmission time unit indication information and/or transport block indication information, the transmission time unit indication information is used to indicate a time length of a transmission time unit of a DL-SCH transport block and/or an uplink shared channel UL-SCH transport block, the time length of the transmission time unit is the first time length or a second time length, the second time length is greater than the first time length, and the transport block indication information includes DL-SCH transport block location information and/or UL-SCH transport block location information.

The processor 902 is coupled to the receiver 903 and the transmitter 904, is configured to control execution of a program instruction, and is specifically configured to control the transmitter 904 to send a random access response RAR for the random access preamble to the UE by using the DL-SCH transport block indicated by the DCI.

The receiver 903 is further configured to receive a UL-SCH transport block sent by the UE according to uplink scheduling information carried by the RAR.

According to the base station provided in this embodiment of the present disclosure, the receiver receives the random access preamble sent by the user equipment UE, where the random access preamble is used to indicate that the UE has the first transmission capability. The transmitter sends the DCI to the UE by using the PDCCH, so that the UE can receive the RAR for the random access preamble according to the DCI; and sends the RAR for the random access preamble to the UE by using the DL-SCH transport block indicated by the DCI. Then the receiver receives the UL-SCH transport block sent by the UE according to the uplink scheduling information carried by the RAR. Compared with the prior art in which UE cannot correctly receive a message when a TTI for transmitting the message is directly reduced, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station. In addition, the UE may also send a message to the base station in the short TTI according to the transmission time unit indication information of the base station. In this way, a time length of a transmission time unit during information transmission is reduced, and further a random access time is reduced.

In another embodiment, of the present disclosure, the processor 902 is further configured to: when the DCI carries the transmission time unit indication information, control the transmitter 904 to send the DL-SCH transport block carrying the RAR for the random access preamble to the UE, where the time length of the transmission time unit of the DL-SCH transport block is the time length indicated by the transmission time unit indication information, and the transmission time unit of the DL-SCH transport block is a transmission time unit adjacent to a transmission time unit of the PDCCH or a transmission time unit of the PDCCH; when the DCI carries the transport block indication information, control the transmitter 904 to send, at a location indicated by the DL-SCH transport block location information indicated by the transport block indication information, the DL-SCH transport block carrying the RAR for the random access preamble to the UE, where the time length of the transmission time unit of the DL-SCH transport block is a preset time length, and the DL-SCH transport block location information includes information about a time domain resource and/or a frequency domain resource of the DL-SCH transport block; or when the DCI carries the transmission time unit indication information and the transport block indication information, control the transmitter 904 to send, at a location indicated by the DL-SCH transport block location information indicated by the transport block indication information, the DL-SCH transport block carrying the RAR for the random access preamble to the UE, where the time length of the transmission time unit of the DL-SCH transport block is the time length indicated by the transmission time unit indication information.

In another embodiment of the present disclosure, the processor 902 is further configured to: when the DCI carries the transmission time unit indication information, control the receiver 903 to receive, according to the transmission time unit indication information on a preset time domain resource of the UL-SCH transport block, the UL-SCH transport block sent by the UE according to the uplink scheduling information carried by the RAR, where the time length of the transmission time unit of the UL-SCH transport block is the time length indicated by the transmission time unit indication information; when the DCI carries the transport block indication information, control the receiver 903 to receive, according to the transport block indication information carried by the DCI, and at a location indicated by the UL-SCH transport block location information indicated by the transport block indication information, the UL-SCH transport block sent by the UE according to the uplink scheduling information carried by the RAR, where the UL-SCH transport block location information includes information about a time domain resource and/or a frequency domain resource of the UL-SCH transport block, and the time length of the transmission time unit of the UL-SCH transport block is a preset time length of the transmission time unit; or when the DCI carries the transmission time unit indication information and the transport block indication information, control the receiver 903 to receive, according to the transmission time unit indication information and the transport block indication information that are carried by the DCI, and at a location indicated by the UL-SCH transport block location information indicated by the transport block indication information, the UL-SCH transport block sent by the UE according to the uplink scheduling information carried by the RAR, where the time length of the transmission time unit of the UL-SCH transport block is the time length indicated by the transmission time unit indication information.

In this embodiment of the present disclosure, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station, and send a message to the base station in the short TTI according to the transmission time unit indication information of the base station. Therefore, the base station can also correctly receive, according to the transmission time unit indication information and/or the transport block indication information carried by the DCI, the UL-SCH transport block sent by the UE. In this way, a time length of a transmission time unit during information transmission is reduced, and further a random access time is reduced.

The processor 902 is further configured to determine, according to the random access preamble received by the receiver 903, that a format of the DCI is a first DCI format, where the first DCI format is a DCI format to be detected only by the UE having the first transmission capability.

The processor 902 is further configured to determine, according to the random access preamble received by the receiver 903, that a format of the DCI is a DCI format 1A or a DCI format 1C, where a bit field used for carrying the transmission time unit indication information and/or the transport block indication information exists in each of the DCI format 1A and the DCI format 1C.

If the format of the DCI is the DCI format 1A, bit information in an MCS bit field in the DCI is used to indicate the transmission time unit indication information.

If the format of the DCI is the DCI format 1C, bit information of a bit field in at least one of a new data indicator NDI bit field, a redundancy version RV bit field, and a MSB bit field of a TPC bit field in the DCI is used to indicate the transmission time unit indication information and/or the transport block indication information.

In another embodiment of the present disclosure, the processor 902 is further configured to scramble, according to a random access radio network temporary identifier RA-RNTI, the DCI carried by the PDCCH, where the RA-RNTI is $(1+t\_id+10*f\_id+X) \bmod Y+1$, where values of X and Y are integers; or the RA-RNTI is $65301+(10*t\_id+f\_id) \bmod 9$, where $t\_id$ is a sequence number of a first subframe of a PRACH that is detected by the base station and that carries the random access preamble, $0 \le t\_id < 10$, $f\_id$ is a second PRACH index of a first subframe of the PRACH carrying the random access preamble, and $0 \le f\_id < 6$.

According to the base station provided in this embodiment of the present disclosure, the receiver receives the random access preamble sent by the user equipment UE, where the random access preamble is used to indicate that the UE has the first transmission capability. The transmitter sends the DCI to the UE by using the PDCCH, so that the UE can receive the RAR for the random access preamble according to the DCI; and sends the RAR for the random access preamble to the UE by using the DL-SCH transport block indicated by the DCI. Then the receiver receives the UL-SCH transport block sent by the UE according to the uplink scheduling information carried by the RAR. Compared with the prior art in which UE cannot correctly receive a message when a TTI for transmitting the message is directly reduced, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station. In addition, the UE may also send a message to the base station in the short TTI according to the transmission time unit indication information of the base station. In this way, a time length of a transmission time unit during information transmission is reduced, and further a random access time is reduced.

Figure 10:
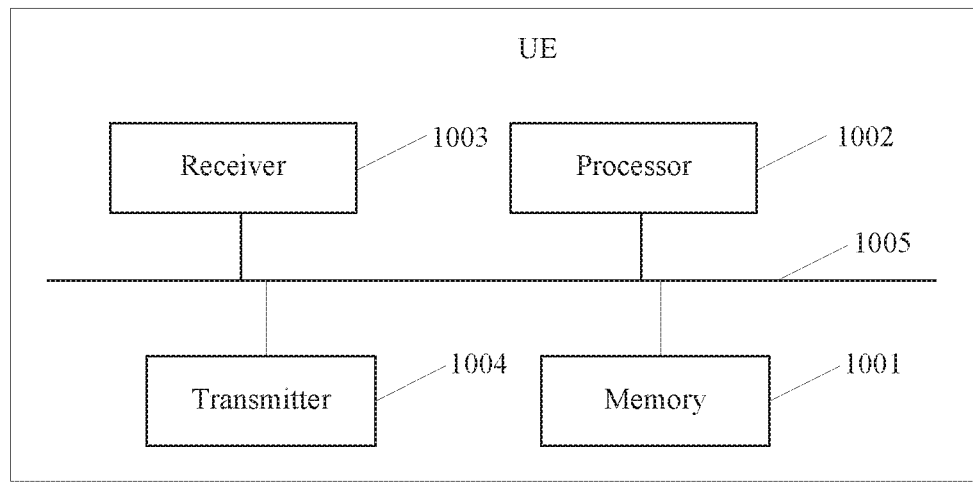
FIG. 10 is a schematic logic structural diagram of UE in a random access method according to an embodiment of the present disclosure.

An embodiment of the present disclosure further provides a random access apparatus. As shown in FIG. 10, the apparatus is a schematic structural diagram of hardware of UE described in FIG. 7 and FIG. 8. The UE may include a memory 1001, a processor 1002, a receiver 1003, a transmitter 1004, and a bus 1005.

The memory 1001 may be a read-only memory (ROM), a static storage device, a dynamic storage device, or a random access memory (RAM). The memory 1001 may store an operating system and another application program. During implementation of the technical solution provided in this embodiment of the present disclosure by using software or firmware, program code for implementing the technical solution provided in this embodiment of the present disclosure is stored in the memory 1001 and is executed by the processor 1002.

The receiver 1003 is configured to implement communication between the apparatus and another device or a communications network (for example, but not limited to, the Ethernet, a radio access network (RAN), or a wireless local area network (WLAN).

The processor 1002 may be a general central processing unit (CPU), a microprocessor, an application-specific integrated circuit (ASIC), or one or more integrated circuits, to execute a related program to implement the technical solution provided in this embodiment of the present disclosure.

The bus 1005 may include a channel for transmitting information between components (such as the memory 1001, the receiver 1003, the transmitter 1004, and the processor 1002) of the apparatus.

It should be noted that although the hardware shown in FIG. 10 shows only the memory 1001, the receiver 1003, the transmitter 1004, the processor 1002, and the bus 1004, in a specific implementation process, a person skilled in the art should understand that the apparatus further includes another device that is necessary for implementing normal running. In addition, a person skilled in the art should understand that according to a specific requirement, the terminal may further include a hardware device for implementing another function.

Specifically, when the UE shown in FIG. 10 is configured to implement the apparatuses shown in the embodiments of FIG. 7 and FIG. 8, the transmitter 1004 in the apparatus is configured to send a random access preamble to a base station, where the random access preamble is used to indicate that the UE has a first transmission capability, and the first transmission capability is a capability of transmitting a transmission time unit of a first time length.

The receiver 1003 is configured to receive downlink control information DCI sent by the base station by using a physical downlink control channel PDCCH, where the DCI carries transmission time unit indication information and/or transport block indication information, the transmission time unit indication information is used to indicate a time length of a transmission time unit of a DL-SCH transport block and/or an uplink shared channel UL-SCH transport block, the time length of the transmission time unit is the first time length or a second time length, the second time length is greater than the first time length, and the transport block indication information includes DL-SCH transport block location information and/or UL-SCH transport block location information.

The processor 1002 coupled to the transmitter 1004 and the receiver 1003, configured to control execution of a program instruction, and specifically configured to: control the receiver 1003 to receive, according to the DCI, a random access response RAR that is for the random access preamble and that is sent by the base station according to the DL-SCH transport block indicated by the DCI; and control the transmitter 1004 to send a UL-SCH transport block according to uplink scheduling information carried by the RAR.

In another embodiment of the present disclosure, the processor 1002 is further configured to: when the DCI carries the transmission time unit indication information, control the receiver 1003 to receive the DL-SCH transport block that carries the RAR for the random access preamble and that is sent by the base station, where the time length of the transmission time unit of the DL-SCH transport block is the time length indicated by the transmission time unit indication information, and the transmission time unit of the DL-SCH transport block is a transmission time unit adjacent to a transmission time unit of the PDCCH or a transmission time unit of the PDCCH; when the DCI carries the transport block indication information, control the receiver 1003 to receive, at a location indicated by the DL-SCH transport block location information indicated by the transport block indication information, the DL-SCH transport block that carries the RAR for the random access preamble and that is sent by the base station, where the time length of the transmission time unit of the DL-SCH transport block is a preset time length, and the DL-SCH transport block location information includes information about a time domain resource and/or a frequency domain resource of the DL-SCH transport block; or when the DCI carries the transmission time unit indication information and the transport block indication information, control the receiver 1003 to receive, at a location indicated by the DL-SCH transport block location information indicated by the transport block indication information, the DL-SCH transport block that carries the RAR for the random access preamble and that is sent by the base station, where the time length of the transmission time unit of the DL-SCH transport block is the time length indicated by the transmission time unit indication information.

In another embodiment of the present disclosure, the processor 1002 is further configured to: when the DCI carries the transmission time unit indication information, control the transmitter 1004 to send, on a preset time domain resource of the UL-SCH transport block, the UL-SCH transport block to the base station according to the uplink scheduling information carried by the RAR and the transmission time unit indication information, where the time length of the transmission time unit of the UL-SCH transport block is the time length indicated by the transmission time unit indication information; when the DCI carries the transport block indication information, control the transmitter 1004 to send, at a location indicated by the UL-SCH transport block location information indicated by the transport block indication information, the UL-SCH transport block to the base station according to the uplink scheduling information carried by the RAR and the transport block indication information carried by the DCI, where the time length of the transmission time unit of the UL-SCH transport block is a preset time length, and the UL-SCH transport block location information includes information about a time domain resource and/or a frequency domain resource of the UL-SCH transport block; or when the DCI carries the transmission time unit indication information and the transport block indication information, control the transmitter 1004 to send, at a location indicated by the UL-SCH transport block location information indicated by the transport block indication information, the UL-SCH transport block to the base station according to the uplink scheduling information carried by the RAR and the transmission time unit indication information and the transport block indication information that are carried by the DCI, where the time length of the transmission time unit of the UL-SCH transport block is the time length indicated by the transmission time unit indication information.

In this embodiment of the present disclosure, the processor 1002 is further configured to: determine a format of the received DCI; and if the format of the DCI is a first DCI format, obtain the transmission time unit indication information and/or the transport block indication information from the DCI, where the first DCI format is a DCI format to be detected only by the UE having the first transmission capability; if the format of the DCI is a DCI format 1A, obtain the transmission time unit indication information from bit information in an MCS bit field in the DCI; or if the format of the DCI is a DCI format 1C, obtain the transmission time unit indication information and/or the transport block indication information from bit information of a bit field in at least one of a new data indicator NDI bit field, a redundancy version RV bit field, and a MSB bit field of a TPC bit field in the DCI.

In another embodiment of the present disclosure, the processor 1002 is further configured to: determine a random access radio network temporary identifier RA-RNTI, where the RA-RNTI is $(1+t\_id+10*f\_id+X) \mod Y+1$, where values of X and Y are integers; or the RA-RNTI is $65301+(10*t\_id+f\_id) \mod 9$, where t_id is a sequence number of a first subframe of a PRACH carrying the random access preamble, $0 \le t\_id < 10$, f_id is a second PRACH index of a first subframe of the PRACH carrying the random access preamble, and $0 \le f\_id < 6$; and descramble, according to the RA-RNTI, the DCI carried by the PDCCH.

According to the UE provided in this embodiment of the present disclosure, the transmitter sends the random access preamble to the base station, where the random access preamble is used to indicate that the UE has the first transmission capability. The receiver receives the DCI sent by the base station by using the PDCCH, and receives, according to the DCI, the random access response RAR that is for the random access preamble and that is sent by the base station according to the DL-SCH transport block indicated by the DCI. Then the transmitter sends the UL-SCH transport block according to the uplink scheduling information carried by the RAR. Compared with the prior art in which UE cannot correctly receive a message when a TTI for transmitting the message is directly reduced, because the DCI carries the transmission time unit indication information, and the transmission time unit indication information and/or the transport block indication information may indicate a time length of a transmission unit of a transport block of the RAR sent by the base station and/or location information of a transport block of the RAR, even if the base station sends a message in a short TTI, the UE can still correctly identify, according to a length of the transport block and/or the location information of the transport block, the message sent by the base station, and send a message to the base station in the short TTI according to the transmission time unit indication information of the base station. In this way, a time length of a transmission time unit during information transmission is reduced, and further a random access time is reduced.

Based on the foregoing descriptions of the implementations, a person skilled in the art may clearly understand that the present disclosure may be implemented by software in addition to necessary universal hardware or by hardware only. In most circumstances, the former is a preferred implementation. Based on such an understanding, the technical solutions of the present disclosure essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A random access method, comprising:
    sending, by user equipment (UE), a random access preamble to a base station for indicating the UE has a first transmission capability of transmitting a transmission time unit of a first time length;
    in response to the random access preamble indicating that the UE has the first transmission capability of transmitting the transmission time unit of the first time length, receiving, by the UE, downlink control information (DCI) sent by the base station by using a physical downlink control channel (PDCCH), wherein the DCI carries at least one of transmission time unit indication information or transport block indication information, the transmission time unit indication information is used to indicate a time length of a transmission time unit of at least one of a downlink shared channel (DL-SCH) transport block or an uplink shared channel (UL-SCH) transport block, the time length of the transmission time unit is the first time length or a second time length, the second time length is greater than the first time length, and the transport block indication information comprises at least one of DL-SCH transport block location information or UL-SCH transport block location information;
    receiving, by the UE according to the DCI, a random access response (RAR) for the random access preamble, wherein the RAR is sent by the base station according to the DL-SCH transport block indicated by the DCI; and
    sending, by the UE, a UL-SCH transport block according to uplink scheduling information carried by the RAR.

2. The random access method according to claim 1, wherein receiving, by the UE according to the DCI, a random access response (RAR) for the random access preamble:
    when the DCI carries the transmission time unit indication information, receiving, by the UE, the DL-SCH transport block that carries the RAR for the random access preamble and that is sent by the base station, wherein the time length of the transmission time unit of the DL-SCH transport block is the time length indicated by the transmission time unit indication information, and the transmission time unit of the DL-SCH transport block is a transmission time unit adjacent to a transmission time unit of the PDCCH or a transmission time unit of the PDCCH;
    when the DCI carries the transport block indication information, receiving, by the UE, at a location indicated by the DL-SCH transport block location information indicated by the transport block indication information, the DL-SCH transport block that carries the RAR for the random access preamble and that is sent by the base station, wherein the time length of the transmission time unit of the DL-SCH transport block is a preset time length, and the DL-SCH transport block location information comprises information about at least one of a time domain resource or a frequency domain resource of the DL-SCH transport block; or when the DCI carries the transmission time unit indication information and the transport block indication information, receiving, by the UE, at a location indicated by the DL-SCH transport block location information indicated by the transport block indication information, the DL-SCH transport block that carries the RAR for the random access preamble and that is sent by the base station, wherein the time length of the transmission time unit of the DL-SCH transport block is the time length indicated by the transmission time unit indication information.

3. The random access method according to claim 1, wherein sending, by the UE, a UL-SCH transport block according to uplink scheduling information carried by the RAR comprises:

when the DCI carries the transmission time unit indication information, sending, by the UE on a preset time domain resource of the UL-SCH transport block, the UL-SCH transport block to the base station according to the uplink scheduling information carried by the RAR and the transmission time unit indication information, wherein the time length of the transmission time unit of the UL-SCH transport block is the time length indicated by the transmission time unit indication information;

when the DCI carries the transport block indication information, sending, by the UE, at a location indicated by the UL-SCH transport block location information indicated by the transport block indication information, the UL-SCH transport block to the base station according to the uplink scheduling information carried by the RAR and the transport block indication information carried by the DCI, wherein the time length of the transmission time unit of the UL-SCH transport block is a preset time length, and the UL-SCH transport block location information comprises information about at least one of a time domain resource or a frequency domain resource of the UL-SCH transport block; or when the DCI carries the transmission time unit indication information and the transport block indication information, sending, by the UE, at a location indicated by the UL-SCH transport block location information indicated by the transport block indication information, the UL-SCH transport block to the base station according to the uplink scheduling information carried by the RAR and the transmission time unit indication information and the transport block indication information that are carried by the DCI, wherein the time length of the transmission time unit of the UL-SCH transport block is the time length indicated by the transmission time unit indication information.

4. The random access method according to claim 3, wherein after receiving, by the UE, downlink control information (DCI) sent by the base station by using a physical downlink control channel (PDCCH), the method further comprises:

determining, by the UE, a format of the received DCI; and when the format of the DCI is a first DCI format, obtaining, by the UE, at least one of the transmission time unit indication information or the transport block indication information from the DCI, wherein the first DCI format is a DCI format to be detected by the UE having the first transmission capability, when the format of the DCI is a DCI format 1A, obtaining, by the UE, the transmission time unit indication information from bit information in an MCS bit field in the DCI, or when the format of the DCI is a DCI format 1C, obtaining, by the UE, at least one of the transmission time unit indication information or the transport block indication information from bit information of a bit field in at least one of a new data indicator (NDI) bit field, a redundancy version RV bit field, or a most significant bit (MSB) bit field of a transmission power control (TPC) bit field in the DCI.

5. The random access method according to claim 4, wherein after receiving, by the UE, downlink control information DCI sent by the base station by using a physical downlink control channel PDCCH, the method further comprises:

determining, by the UE, a random access radio network temporary identifier (RA-RNTI), wherein the RA-RNTI is $(1+t\_id+10*f\_id+X) \mod Y+1$, wherein values of X and Y are integers; or the RA-RNTI is $65301+(10*t\_id+f\_id) \mod 9$, wherein $t\_id$ is a sequence number of a first subframe of a PRACH carrying the random access preamble, $0 \leq t\_id < 10$, $f\_id$ is a second PRACH index of a first subframe of the PRACH carrying the random access preamble, and $0 \leq f\_id < 6$; and descrambling, by the UE according to the RA-RNTI, the DCI carried by the PDCCH.

6. A random access apparatus applied to a base station, the apparatus comprising:

a receiver, configured to receive a random access preamble sent by user equipment (UE), wherein the random access preamble is used to indicate the UE has a first transmission capability of transmitting a transmission time unit of a first time length;

a transmitter, configured to, in response to the random access preamble, send downlink control information (DCI) to the UE by using a physical downlink control channel (PDCCH), wherein the DCI carries at least one of transmission time unit indication information or transport block indication information, the transmission time unit indication information is used to indicate a time length of a transmission time unit of at least one of a downlink shared channel (DL-SCH) transport block or an uplink shared channel (UL-SCH) transport block, the time length of the transmission time unit is the first time length or a second time length, the second time length is greater than the first time length, and the transport block indication information comprises at least one of DL-SCH transport block location information or UL-SCH transport block location information;

a processor, configured to control the transmitter to send a random access response (RAR) for the random access preamble to the UE by using the DL-SCH transport block indicated by the DCI; and wherein the receiver is further configured to receive a UL-SCH transport block sent by the UE according to uplink scheduling information carried by the RAR.

7. The random access apparatus according to claim 6, wherein the processor is further configured to:

when the DCI carries the transmission time unit indication information, control the transmitter to send the DL-SCH transport block carrying the RAR for the random access preamble to the UE, wherein the time length of the transmission time unit of the DL-SCH transport block is the time length indicated by the transmission time unit indication information, and the transmission time unit of the DL-SCH transport block is a transmission time unit adjacent to a transmission time unit of the PDCCH or a transmission time unit of the PDCCH;

when the DCI carries the transport block indication information, control the transmitter to send, at a location indicated by the DL-SCH transport block location information indicated by the transport block indication information, the DL-SCH transport block carrying the RAR for the random access preamble to the UE, wherein the time length of the transmission time unit of the DL-SCH transport block is a preset time length, and the DL-SCH transport block location information comprises information about at least one of a time domain resource or a frequency domain resource of the DL-SCH transport block; or when the DCI carries the transmission time unit indication information and the transport block indication information, control the transmitter to send, at a location indicated by the DL-SCH transport block location information indicated by the transport block indication information, the DL-SCH transport block carrying the RAR for the random access preamble to the UE, wherein the time length of the transmission time unit of the DL-SCH transport block is the time length indicated by the transmission time unit indication information.

8. The random access apparatus according to claim 6, wherein the processor is further configured to:
when the DCI carries the transmission time unit indication information, control the receiver to receive, according to the transmission time unit indication information on a preset time domain resource of the UL-SCH transport block, the UL-SCH transport block sent by the UE according to the uplink scheduling information carried by the RAR, wherein the time length of the transmission time unit of the UL-SCH transport block is the time length indicated by the transmission time unit indication information;

when the DCI carries the transport block indication information, control the receiver to receive, according to the transport block indication information carried by the DCI, and at a location indicated by the UL-SCH transport block location information indicated by the transport block indication information, the UL-SCH transport block sent by the UE according to the uplink scheduling information carried by the RAR, wherein the UL-SCH transport block location information comprises information about at least one of a time domain resource or a frequency domain resource of the UL-SCH transport block, and the time length of the transmission time unit of the UL-SCH transport block is a preset time length of the transmission time unit; or when the DCI carries the transmission time unit indication information and the transport block indication information, control the receiver to receive, according to the transmission time unit indication information and the transport block indication information that are carried by the DCI, and at a location indicated by the UL-SCH transport block location information indicated by the transport block indication information, the UL-SCH transport block sent by the UE according to the uplink scheduling information carried by the RAR, wherein the time length of the transmission time unit of the UL-SCH transport block is the time length indicated by the transmission time unit indication information.

9. The random access apparatus according to claim 8, wherein the processor is configured to:
determine, according to the random access preamble received by the receiver, that a format of the DCI is a first DCI format, wherein the first DCI format is a DCI format to be detected by the UE having the first transmission capability.

10. The random access apparatus according to claim 9, wherein:
when the format of the DCI is the DCI format 1A, bit information in an MCS bit field in the DCI is used to indicate the transmission time unit indication information; or
when the format of the DCI is the DCI format 1C, bit information of a bit field in at least one of a new data indicator NDI bit field, a redundancy version RV bit field, or a most significant bit (MSB) bit field of a transmission power control (TPC) bit field in the DCI is used to indicate at least one of the transmission time unit indication information or the transport block indication information.

11. The random access apparatus according to claim 8, wherein the processor is further configured to:
determine, according to the random access preamble received by the receiver, that a format of the DCI is a DCI format 1A or a DCI format 1C, wherein a bit field used for carrying at least one of the transmission time unit indication information or the transport block indication information exists in each of the DCI format 1A and the DCI format 1C.

12. The random access apparatus according to claim 6, wherein the processor is configured to:
scramble, according to a random access radio network temporary identifier (RA-RNTI), the DCI carried by the PDCCH, wherein the RA-RNTI is (1+t_id+10*f_id+X)mod Y+1, wherein values of X and Y are integers; or the RA-RNTI is 65301+(10*t_id+f_id)mod 9, wherein t_id is a sequence number of a first subframe of a PRACH that is detected by the base station and that carries the random access preamble, 0≤t_id<10, f_id is a second PRACH index of a first subframe of the PRACH carrying the random access preamble, and 0≤f_id<6.

13. A random access apparatus applied to user equipment (UE), the apparatus comprising:
a transmitter, configured to send a random access preamble to a base station for indicating the UE has a first transmission capability of transmitting a transmission time unit of a first time length;
a receiver, configured to receive, in response to the random access preamble indicating that the UE has the first transmission capability of transmitting the transmission time unit of the first time length, downlink control information (DCI) sent by the base station by using a physical downlink control channel (PDCCH), wherein the DCI carries at least one of transmission time unit indication information or transport block indication information, the transmission time unit indication information is used to indicate a time length of a transmission time unit of at least one of a downlink shared channel (DL-SCH) transport block or an uplink shared channel (UL-SCH) transport block, the time length of the transmission time unit is the first time length or a second time length, the second time length is greater than the first time length, and the transport block indication information comprises at least one of DL-SCH transport block location information or UL-SCH transport block location information; and a processor, configured to:

control the receiver to receive, according to the DCI, a random access response (RAR) for the random access preamble, wherein the RAR is sent by the base station according to the DL-SCH transport block indicated by the DCI, and control the transmitter to send a UL-SCH transport block according to uplink scheduling information carried by the RAR.

14. The random access apparatus according to claim 13, wherein the processor is further configured to:

when the DCI carries the transmission time unit indication information, control the receiver to receive the DL-SCH transport block that carries the RAR for the random access preamble and that is sent by the base station, wherein the time length of the transmission time unit of the DL-SCH transport block is the time length indicated by the transmission time unit indication information, and the transmission time unit of the DL-SCH transport block is a transmission time unit adjacent to a transmission time unit of the PDCCH or a transmission time unit of the PDCCH;

when the DCI carries the transport block indication information, control the receiver to receive, at a location indicated by the DL-SCH transport block location information indicated by the transport block indication information, the DL-SCH transport block that carries the RAR for the random access preamble and that is sent by the base station, wherein the time length of the transmission time unit of the DL-SCH transport block is a preset time length, and the DL-SCH transport block location information comprises information about at least one of a time domain resource or a frequency domain resource of the DL-SCH transport block; or when the DCI carries the transmission time unit indication information and the transport block indication information, control the receiver to receive, at a location indicated by the DL-SCH transport block location information indicated by the transport block indication information, the DL-SCH transport block that carries the RAR for the random access preamble and that is sent by the base station, wherein the time length of the transmission time unit of the DL-SCH transport block is the time length indicated by the transmission time unit indication information.

15. The random access apparatus according to claim 13, wherein the processor is further configured to:

when the DCI carries the transmission time unit indication information, control the transmitter to send, on a preset time domain resource of the UL-SCH transport block, the UL-SCH transport block to the base station according to the uplink scheduling information carried by the RAR and the transmission time unit indication information, wherein the time length of the transmission time unit of the UL-SCH transport block is the time length indicated by the transmission time unit indication information;

when the DCI carries the transport block indication information, control the transmitter to send, at a location indicated by the UL-SCH transport block location information indicated by the transport block indication information, the UL-SCH transport block to the base station according to the uplink scheduling information carried by the RAR and the transport block indication information carried by the DCI, wherein the time length of the transmission time unit of the UL-SCH transport block is a preset time length, and the UL-SCH transport block location information comprises information about at least one of a time domain resource or a frequency domain resource of the UL-SCH transport block; or when the DCI carries the transmission time unit indication information and the transport block indication information, control the transmitter to send, at a location indicated by the UL-SCH transport block location information indicated by the transport block indication information, the UL-SCH transport block to the base station according to the uplink scheduling information carried by the RAR and the transmission time unit indication information and the transport block indication information that are carried by the DCI, wherein the time length of the transmission time unit of the UL-SCH transport block is the time length indicated by the transmission time unit indication information.

16. The random access apparatus according to claim 15, wherein the processor is configured to:

determine a format of the received DCI received by the receiver; and when the processor determines that the format of the DCI is a first DCI format, obtain at least one of the transmission time unit indication information or the transport block indication information from the DCI, wherein the first DCI format is a DCI format to be detected by the UE having the first transmission capability, when the format of the DCI is a DCI format 1A, obtain the transmission time unit indication information from bit information in an MCS bit field in the DCI, or when the format of the DCI is a DCI format 1C, obtain at least one of the transmission time unit indication information or the transport block indication information from bit information of a bit field in at least one of a new data indicator (NDI) bit field, a redundancy version (RV) bit field, or a most significant bit (MSB) bit field of a transmission power control (TPC) bit field in the DCI.

17. The random access apparatus according to claim 13, wherein the processor is further configured to:

determine a random access radio network temporary identifier (RA-RNTI), wherein the RA-RNTI is (1+t_id+10*f_id+X)mod Y+1, wherein values of X and Y are integers; or the RA-RNTI is 65301+(10*t_id+f_id)mod 9, wherein t_id is a sequence number of a first subframe of a PRACH carrying the random access preamble, 0≤t_id<10, f_id is a second PRACH index of a first subframe of the PRACH carrying the random access preamble, and 0≤f_id<6; and descramble, according to the RA-RNTI determined by the processor, the DCI carried by the PDCCH.

* * * * *